United States Patent
Yu

(10) Patent No.: US 10,944,897 B2
(45) Date of Patent: Mar. 9, 2021

(54) CONTRAST DETECTION AUTOFOCUS USING ADAPTIVE STEP

(71) Applicant: SZ DJI TECHNOLOGY CO., LTD., Shenzhen (CN)

(72) Inventor: Lifu Yu, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 17/025,949

(22) Filed: Sep. 18, 2020

(65) Prior Publication Data
US 2021/0006728 A1   Jan. 7, 2021

Related U.S. Application Data

(63) Continuation of application No. 16/113,852, filed on Aug. 27, 2018, now Pat. No. 10,798,286, which is a
(Continued)

(51) Int. Cl.
| H04N 5/232 | (2006.01) |
| G03B 15/00 | (2021.01) |
| G03B 13/36 | (2021.01) |
| G06T 7/55  | (2017.01) |
| G06T 7/80  | (2017.01) |

(52) U.S. Cl.
CPC ....... H04N 5/232123 (2018.08); G03B 13/36 (2013.01); G03B 15/006 (2013.01); G06T 7/55 (2017.01); G06T 7/80 (2017.01); *G06T 2207/20024* (2013.01); *G06T 2207/30252* (2013.01)

(58) Field of Classification Search
CPC ................................................ H04N 5/232123
USPC ......................... 348/345, 349, 353, 354, 356
See application file for complete search history.

(56) References Cited

U.S. PATENT DOCUMENTS

| 5,005,086 A | 4/1991 | Iwamoto et al. |
| 5,070,408 A | 12/1991 | Kikuch et al. |
(Continued)

FOREIGN PATENT DOCUMENTS

| CN | 1917585 A | 2/2007 |
| CN | 1926852 A | 3/2007 |
(Continued)

OTHER PUBLICATIONS

The World Intellectual Property Organization (WIPO) International Search Report and Written Opinion for PCT/CN2016/079506 dated Jan. 18, 2017 6 pages.

*Primary Examiner* — Anthony J Daniels
(74) *Attorney, Agent, or Firm* — Anova Law Group, PLLC

(57) ABSTRACT

A method for moving an optical device relative to an image sensor to focus an image includes receiving a current image acquired by the image sensor when the optical device is at a current position relative to the image sensor, obtaining a current contrast value of the current image and a current contrast variation rate at the current position, determining whether the current contrast variation rate meets a first threshold criterion, moving the optical device from the current position to a next position in accordance with the determination result, and repeating the aforementioned operations until a next contrast variation rate for a next image meets a second threshold criterion. The next image is acquired when the optical device is at the next position.

20 Claims, 21 Drawing Sheets

Related U.S. Application Data continuation of application No. PCT/CN2016/079506, filed on Apr. 15, 2016.

(56) References Cited

U.S. PATENT DOCUMENTS

| | | |
|---|---|---|
| 7,929,044 B2 | 4/2011 | Chen et al. |
| 9,826,156 B1 | 11/2017 | Liu et al. |
| 2008/0136958 A1 | 6/2008 | Nakahara |
| 2017/0289439 A1* | 10/2017 | Miyazawa ............. G03B 13/36 |
| 2018/0164542 A1* | 6/2018 | Wakazono ............... G02B 7/28 |

FOREIGN PATENT DOCUMENTS

| | | |
|---|---|---|
| CN | 101907815 A | 12/2010 |
| CN | 101924880 A | 12/2010 |
| CN | 102129146 A | 7/2011 |
| CN | 102629978 A | 8/2012 |
| CN | 103235397 A | 8/2013 |
| EP | 2648401 A1 | 10/2013 |
| JP | 2008228185 A | 9/2008 |

* cited by examiner

1100

---

1114
Determining that the first contrast variation rate meets the first threshold criterion includes comparing the first contrast variation rate to a first threshold gradient value

1116
The first contrast variation rate meets the first threshold criterion when the first contrast variation rate exceeds a first threshold gradient value

---

1118
Determining that the second contrast variation rate meets the second threshold criterion includes comparing the second contrast variation rate to a second threshold gradient value, wherein the second threshold gradient value is less than the first threshold gradient value.

---

1120
Determining at least one of the first step size and the second step size includes: generating a curve based on a plurality of contrast values including the first contrast value; determining a position of the optical device relative to the image sensor at which the curve has a peak value; and determining the first step size using the determined position of the optical device relative to the image sensor at which the curve has a peak value

1122
In at least one iteration of the repeating operation, the curve is a Bèzier curve

1124
The Bèzier curve is a cubic Bèzier curve

1126
In at least one iteration of the repeating operation, the curve is determined using a non-linear least squares analysis.

1128
The first contrast value is determined using at least one luminance gradient value from the first image, wherein a respective luminance gradient value is a luminance gradient across a portion of the first image

1130
The first contrast value is determined using an average of a plurality of luminance gradient values from the first image

1132
In response to determining that the second contrast variation rate meets the second threshold criterion, applying a filter to a plurality of obtained contrast values to generate a filtered curve

1134
The filter is a low pass filter

1136
The low pass filter is a one-dimensional Gaussian filter

1138
Determine whether the filtered curve at the current position of the optical device relative to the image sensor satisfies an end criterion, and, in response to determining that the does not satisfy the end criterion: initialize the optical device at an initial position relative to the image sensor; and repeat the aforementioned operations

1140
Determining whether the filtered curve at the current position of the optical device relative to the image sensor satisfies the end criterion includes determining whether a gradient of the filtered curve at the current position of the optical device relative to the image sensor meets a third threshold criterion

1142
The second contrast variation rate is determined using a second contrast value obtained for the second image

---

1144
The first contrast variation rate is a gradient value indicating a rate of change of a contrast value from a previous image to a current image 1146
A contrast value difference is a difference between the first contrast value and a contrast value of a previous image; a distance difference is a difference between a first distance between the optical device and the image sensor at which the first image is captured and a previous distance between the optical device and the image sensor at which the previous image was captured; and the rate of change of the contrast value is the contrast value difference divided by the distance difference

Figure 11D

CONTRAST DETECTION AUTOFOCUS USING ADAPTIVE STEP

CROSS-REFERENCE TO RELATED APPLICATION

This application is a continuation of U.S. patent application Ser. No. 16/113,852, filed on Aug. 27, 2018, which is a continuation of International Application No. PCT/CN2016/079506, filed on Apr. 15, 2016, the entire contents of both which are incorporated herein by reference.

TECHNICAL FIELD

The disclosed embodiments relate generally to focusing an image and more particularly, but not exclusively, to a contrast detection focusing operation that iteratively adjusts the amount by which a distance between an optical device and an image sensor is increased.

BACKGROUND

Contrast detection autofocus techniques typically rely on adjusting camera focus until an optimal focus point is passed in order to home in on the optical focus point. When a camera is a component of a UAV, adjusting camera focus presents unique challenges, particularly if the adjustment is to be made while the UAV is in flight. Reducing the movement of an optical component of a UAV is beneficial for image stability and flight control.

SUMMARY

There is a need for systems and methods for moving an optical device relative to an image sensor to focus an image. Such systems and methods optionally complement or replace conventional methods for moving an optical device relative to an image sensor to focus an image.

In accordance with some embodiments, a method for moving an optical device relative to an image sensor to focus an image comprises: acquiring, by the image sensor, a first image when the optical device is at a first position relative to the image sensor; obtaining a first contrast value of the first image and a first contrast variation rate at the first position; and determining whether the first contrast variation rate meets a first threshold criterion. In accordance with a determination that the contrast variation rate meets the first threshold criterion: a first step size is determined, wherein the first step size is greater than a previous step size used for moving the optical device to the first position, and the optical device is moved from the first position to a second position according to the first step size. In accordance with a determination that the first contrast variation rate does not meet the first threshold criterion: a second step size is determined, wherein the second step size is smaller than the previous step size used for moving the optical device to the first position, and the optical device is moved from the first position to the second position according to the second step size. The aforementioned operations are repeated until a second contrast variation rate for a second image meets a second threshold criterion, wherein the second image is acquired when the optical device is at the second position.

In accordance with some embodiments, a system for moving an optical device relative to an image sensor to focus an image comprises one or more processors and an imaging device comprising an image sensor and an optical device. The one or more processors are configured for: acquiring, by the image sensor, a first image when the optical device is at a first position relative to the image sensor; obtaining a first contrast value of the first image and a first contrast variation rate at the first position; and determining whether the first contrast variation rate meets a first threshold criterion. The one or more processors are further configured for, in accordance with a determination that the contrast variation rate meets the first threshold criterion: determining a first step size, wherein the first step size is greater than a previous step size used for moving the optical device to the first position, and moving the optical device from the first position to a second position according to the first step size. The one or more processors are further configured for, in accordance with a determination that the first contrast variation rate does not meet the first threshold criterion: determining a second step size, wherein the second step size is smaller than the previous step size used for moving the optical device to the first position, and moving the optical device from the first position to the second position according to the second step size. The one or more processors are further configured for repeating the aforementioned operations until a second contrast variation rate for a second image meets a second threshold criterion, wherein the second image is acquired when the optical device is at the second position.

In accordance with some embodiments, an unmanned aerial vehicle (UAV) comprises a propulsion system, an imaging device comprising an image sensor and an optical device, and one or more processors. The one or more processors are configured for: acquiring, by the image sensor, a first image when the optical device is at a first position relative to the image sensor; obtaining a first contrast value of the first image and a first contrast variation rate at the first position; and determining whether the first contrast variation rate meets a first threshold criterion. The one or more processors are further configured for, in accordance with a determination that the contrast variation rate meets the first threshold criterion: determining a first step size, wherein the first step size is greater than a previous step size used for moving the optical device to the first position, and moving the optical device from the first position to a second position according to the first step size. The one or more processors are further configured for, in accordance with a determination that the first contrast variation rate does not meet the first threshold criterion: determining a second step size, wherein the second step size is smaller than the previous step size used for moving the optical device to the first position, and moving the optical device from the first position to the second position according to the second step size. The one or more processors are further configured for repeating the aforementioned operations until a second contrast variation rate for a second image meets a second threshold criterion, wherein the second image is acquired when the optical device is at the second position.

In accordance with some embodiments, a computer readable storage medium stores one or more programs, the one or more programs comprising instructions, which when executed, cause an imaging device to: acquire, by an image sensor, a first image when an optical device is at a first position relative to the image sensor; obtain a first contrast value of the first image and a first contrast variation rate at the first position; and determine whether the first contrast variation rate meets a first threshold criterion. The one or more programs further cause the imaging device to, in accordance with a determination that the contrast variation rate meets the first threshold criterion: determine a first step size, wherein the first step size is greater than a previous step size used for moving the optical device to the first position, and move the optical device from the first position to a second position according to the first step size. The one or more programs further cause the imaging device to, in accordance with a determination that the first contrast variation rate does not meet the first threshold criterion: determine a second step size, wherein the second step size is smaller than the previous step size used for moving the optical device to the first position, and move the optical device from the first position to the second position according to the second step size. The one or more programs further cause the imaging device to repeat the aforementioned operations until a second contrast variation rate for a second image meets a second threshold criterion, wherein the second image is acquired when the optical device is at the second position.

BRIEF DESCRIPTION OF THE DRAWINGS

FIGS. 11A-11D are a flow diagram illustrating a method for moving an optical device relative to an image sensor to focus an image, in accordance with some embodiments.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The following description uses an unmanned aerial vehicle (UAV) as an example of a movable object. UAVs include, e.g., fixed-wing aircrafts and rotary-wing aircrafts such as helicopters, quadcopters, and aircraft having other numbers and/or configurations of rotors. It will be apparent to those skilled in the art that other types of movable objects may be substituted for UAVs as described below.

Techniques related to optical adjustments for movable objects such as UAVs are described herein.

Figure 1A:
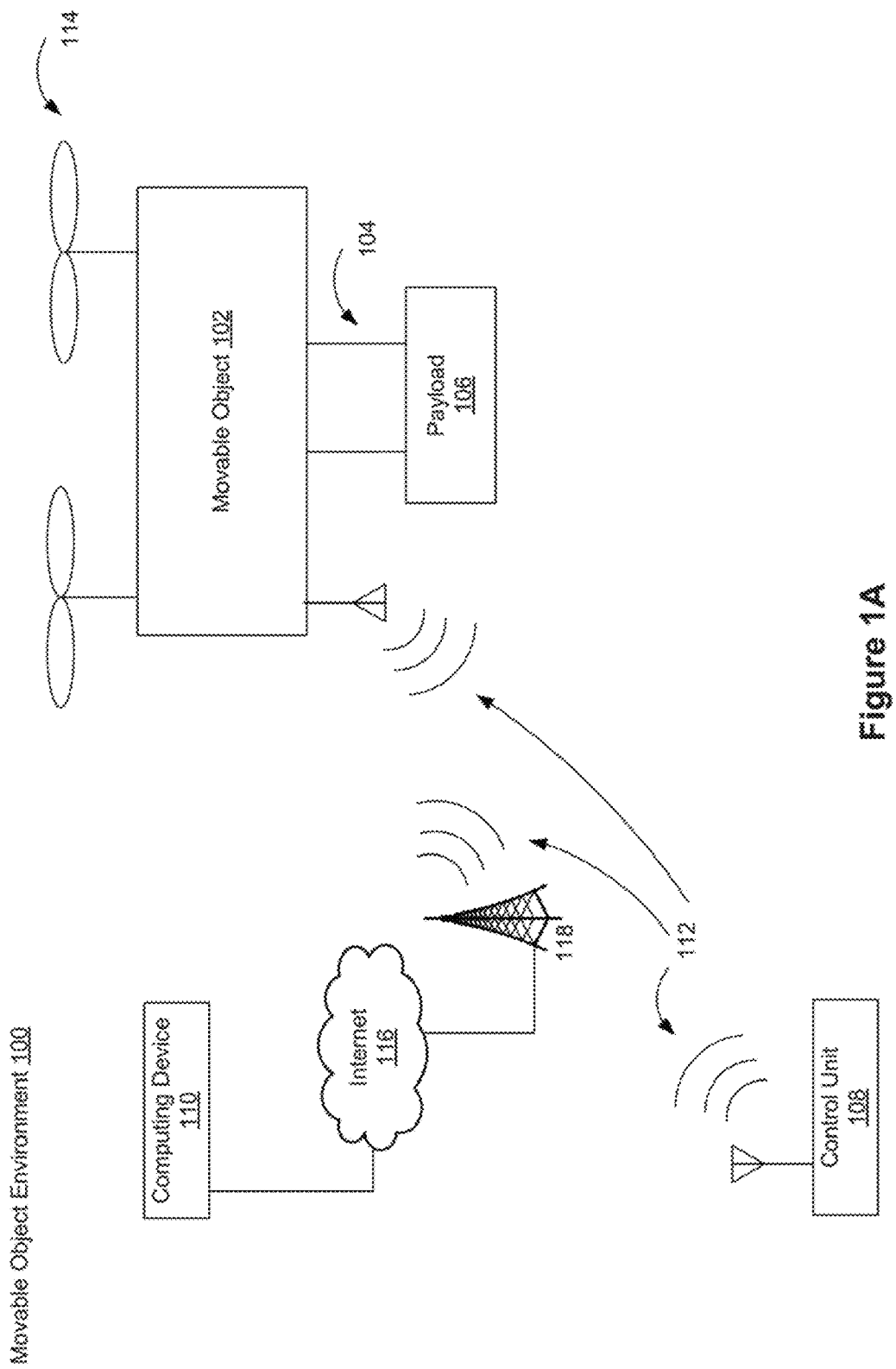
FIGS. 1A-1B illustrate movable object environments, in accordance with some embodiments.

FIG. 1A illustrates a movable object environment 100, in accordance with some embodiments. The movable object environment 100 includes a movable object 102. In some embodiments, the movable object 102 includes a carrier 104 and/or a payload 106.

In some embodiments, the carrier 104 is used to couple a payload 106 to movable object 102. In some embodiments, the carrier 104 includes an element (e.g., a gimbal and/or damping element) to isolate the payload 106 from movement of the movable object 102 and/or the movement mechanism 114. In some embodiments, the carrier 104 includes an element for controlling movement of the payload 106 relative to the movable object 102.

In some embodiments, the payload 106 is coupled (e.g., rigidly coupled) to the movable object 102 (e.g., coupled via carrier 104) such that the payload 106 remains substantially stationary relative to movable object 102. For example, the carrier 104 is coupled to the payload 106 such that the payload is not movable relative to the movable object 102. In some embodiments, the payload 106 is mounted directly to the movable object 102 without requiring the carrier 104. In some embodiments, the payload 106 is located partially or fully within the movable object 102.

In some embodiments, the control unit 108 communicates with the movable object 102, e.g., to provide control instructions to the movable object 102 and/or to display information received from the movable object 102. Although the control unit 108 is typically a portable (e.g., handheld) device, control unit 108 need not be portable. In some embodiments, the control unit 108 is a dedicated control device (e.g., for the movable object 102), a laptop computer, a desktop computer, a tablet computer, a gaming system, a wearable device (e.g., glasses, a glove, and/or a helmet), a microphone, a portable communication device (e.g., a mobile telephone) and/or a combination thereof.

In some embodiments, an input device of the control unit 108 receives user input to control aspects of the movable object 102, the carrier 104, the payload 106, and/or a component thereof. Such aspects include, e.g., attitude, position, orientation, velocity, acceleration, navigation, and/or tracking. For example, a position of an input device of the control unit 108 (e.g., a position of a component of input device) is manually set by a user to a position corresponding to an input (e.g., a predetermined input) for controlling the movable object 102. In some embodiments, the input device is manipulated by a user to input control instructions for controlling the navigation of the movable object 102. In some embodiments, an input device of control unit 108 is used to input a flight mode for the movable object 102, such as auto pilot or navigation according to a predetermined navigation path.

In some embodiments, a display of the control unit 108 displays information generated by the movable object sensing system 210, the memory 204, and/or another system of the movable object 102. For example, the display displays information about the movable object 102, the carrier 104, and/or the payload 106, such as position, attitude, orientation, movement characteristics of the movable object 102, and/or distance between the movable object 102 and another object (e.g., a target and/or an obstacle). In some embodiments, information displayed by a display of control unit 108 includes images captured by the imaging device 302, tracking data (e.g., a graphical tracking indicator applied to a representation of a target), and/or indications of control data transmitted to the movable object 102. In some embodiments, information displayed by the display of the control unit 108 is displayed in substantially real-time as information is received from the movable object 102 and/or as image data is acquired. In some embodiments, the display of the control unit 108 is a touchscreen display.

In some embodiments, the computing device 110 is, e.g., a server computer, desktop computer, a laptop computer, a tablet, or another portable electronic device (e.g., a mobile telephone). In some embodiments, the computing device 110 is a base station that communicates (e.g., wirelessly) with the movable object 102 and/or the control unit 108. In some embodiments, the computing device 110 provides data storage, data retrieval, and/or data processing operations, e.g., to reduce the processing power and/or data storage requirements of the movable object 102 and/or the control unit 108. For example, the computing device 110 is communicatively connected to a database and/or the computing device 110 includes a database. In some embodiments, the computing device 110 is used in lieu of or in addition to the control unit 108 to perform any of the operations described with regard to the control unit 108.

In some embodiments, the movable object 102 communicates with a control unit 108 and/or a computing device 110, e.g., via wireless communications 112. In some embodiments, the movable object 102 receives information from the control unit 108 and/or the computing device 110. For example, information received by the movable object 102 includes, e.g., control instructions for controlling parameters of movable object 102. In some embodiments, the movable object 102 transmits information to the control unit 108 and/or the computing device 110. For example, information transmitted by the movable object 102 includes, e.g., images and/or video captured by the movable object 102.

In some embodiments, communications between the computing device 110, the control unit 108 and/or the movable object 102 are transmitted via a network (e.g., Internet 116) and/or a wireless signal transmitter (e.g., a long range wireless signal transmitter) such as a cellular tower 118. In some embodiments, a satellite (not shown) is a component of Internet 116 and/or is used in addition to or in lieu of the cellular tower 118.

In some embodiments, information communicated between the computing device 110, the control unit 108 and/or the movable object 102 include control instructions. Control instructions include, e.g., navigation instructions for controlling navigational parameters of the movable object 102 such as position, orientation, attitude, and/or one or more movement characteristics of the movable object 102, the carrier 104, and/or the payload 106. In some embodiments, control instructions include instructions directing movement of one or more of the movement mechanisms 114. For example, control instructions are used to control flight of a UAV.

In some embodiments, control instructions include information for controlling operations (e.g., movement) of the carrier 104. For example, control instructions are used to control an actuation mechanism of the carrier 104 so as to cause angular and/or linear movement of the payload 106 relative to the movable object 102. In some embodiments, control instructions adjust movement of the movable object 102 with up to six degrees of freedom.

In some embodiments, control instructions are used to adjust one or more operational parameters for the payload 106. For example, control instructions include instructions for adjusting an optical parameter (e.g., an optical parameter of an imaging device 302). In some embodiments, control instructions include instructions for adjusting imaging properties and/or image device functions, such as adjusting a distance between an image sensor 304 and an optical device 306, instructions for capturing an image, initiating/ceasing video capture, powering an imaging device 302 on or off, adjusting an imaging mode (e.g., capturing still images or capturing video), adjusting a distance between left and right components of a stereographic imaging system, and/or adjusting a position, orientation, and/or movement (e.g., pan rate, pan distance) of a carrier 104, a payload 106 and/or an imaging device 302.

In some embodiments, when control instructions are received by movable object 102, the control instructions change parameters of and/or are stored by the memory 204.

Figure 1B:
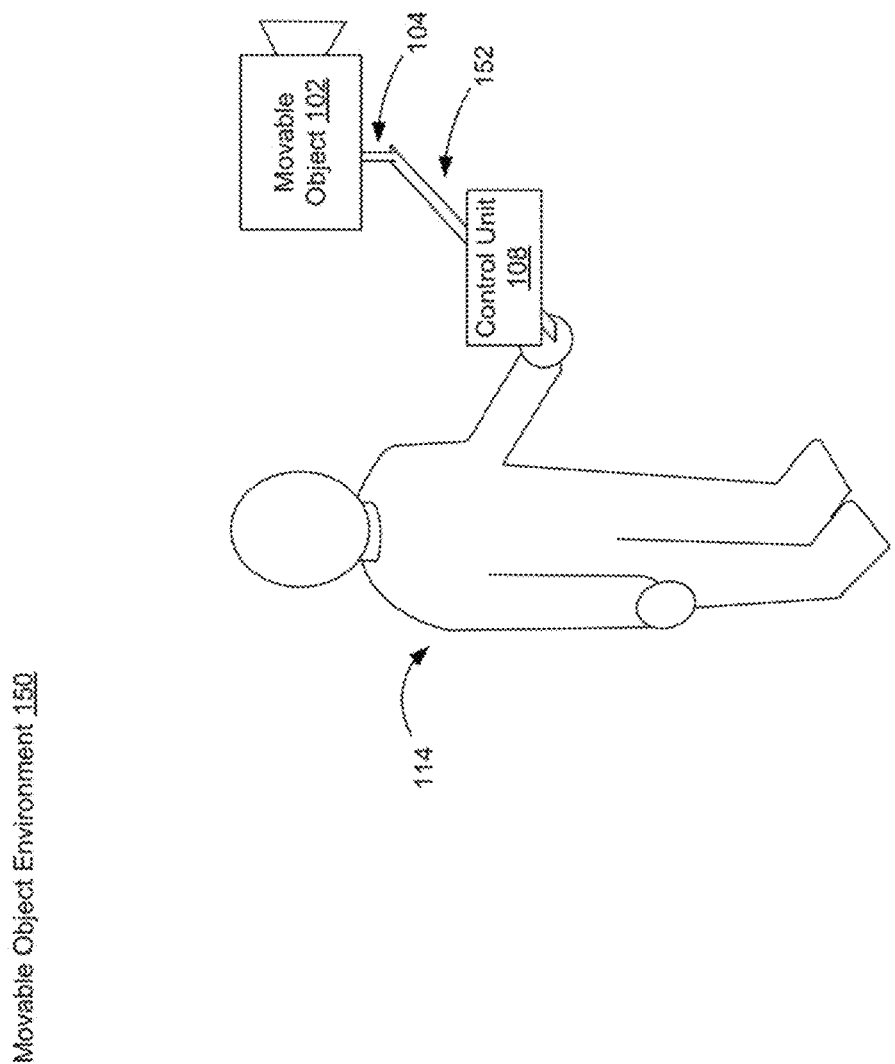

FIG. 1B illustrates a movable environment 150, in accordance with some embodiments. In the movable object environment 150, the movable object 102 is moved by a movement mechanism 114 that is remote from the movable object 102, e.g., a person, animal, vehicle, dolly, and/or other moving device. For example, the movable object 102 is a device that is handheld and/or wearable. In some embodiments, movable object is coupled (e.g., via the carrier 104) to a support structure 152 that is handheld and/or wearable.

In some embodiments, a carrier 104 is coupled to the movable object 102. In some embodiments, the carrier 104 includes one or more mechanisms that allow the movable object 102 to move relative to a movement mechanism 114 and/or relative to the support structure 152. In some embodiments, the movable object 102 is coupled to the support structure 152 via a carrier 104 that includes a gimbal.

In some embodiments, the movable object 102 is communicatively coupled to the control unit 108 via a wired and/or wireless connection. In some embodiments, information transmitted from the control unit 108 to movable object includes, e.g., control instructions for altering one or more operating parameters of the movable object 102. For example, the movable object 102 receives control instructions for altering an optical parameter of an imaging device 302 of the movable object 102. In some embodiments, information transmitted from the movable object 102 to the control unit 108 includes, e.g., image and/or video data captured by movable object 102.

Figure 2A:
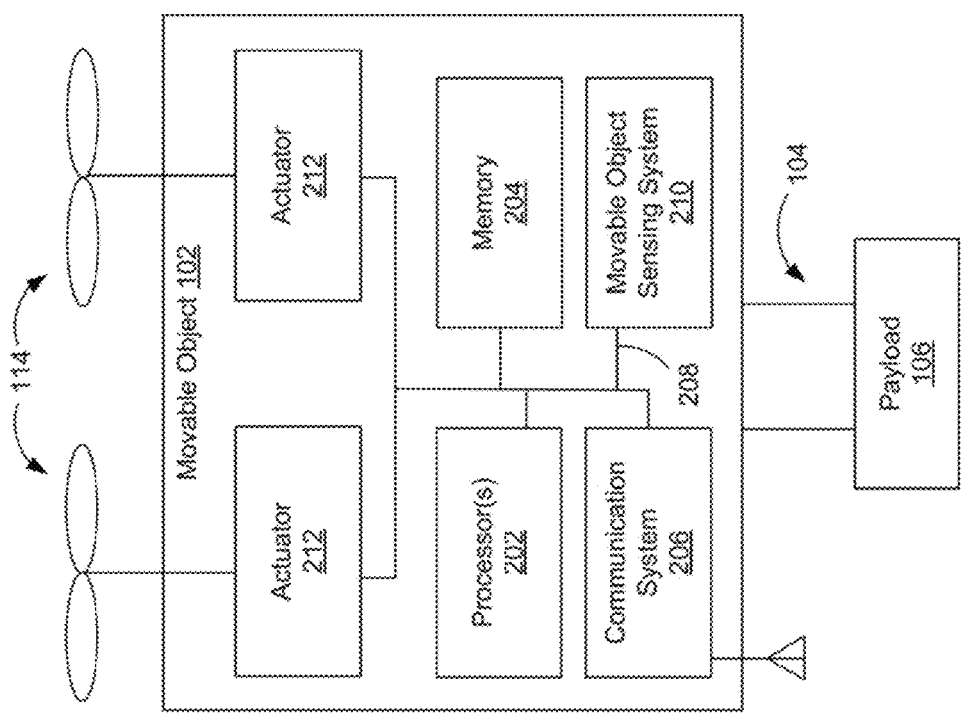
FIG. 2A illustrates a movable object in the movable object environment of FIG. 1A, in accordance with some embodiments.

FIG. 2A illustrates an exemplary movable object 102 in a movable object environment 100, in accordance with some embodiments. The movable object 102 typically includes one or more processing units 202, a memory 204, a communication system 206, a movable object sensing system 210, and a communication bus 208 for interconnecting these components.

In some embodiments, the movable object 102 is a UAV and includes components to enable flight and/or flight control. In some embodiments, the movable object 102 includes the communication system 206 with one or more network or other communications interfaces, the movement mechanisms 114, and/or the movable object actuators 212, which are optionally interconnected with one or more other components of the movable object 102 via the communication bus 208. Although the movable object 102 is depicted as an aircraft, this depiction is not intended to be limiting, and any suitable type of movable object can be used.

In some embodiments, the movable object 102 includes movement mechanisms 114 (e.g., propulsion mechanisms). Although the plural term "movement mechanisms" is used herein for convenience of reference, "movement mechanisms 114" refers to a single movement mechanism (e.g., a single propeller) or multiple movement mechanisms (e.g., multiple rotors). The movement mechanisms 114 include one or more movement mechanism types such as rotors, propellers, blades, engines, motors, wheels, axles, magnets, nozzles, and so on. The movement mechanisms 114 are coupled to movable object 102 at, e.g., the top, bottom, front, back, and/or sides. In some embodiments, the movement mechanisms 114 of a single movable object 102 include multiple movement mechanisms of the same type. In some embodiments, the movement mechanisms 114 of a single movable object 102 include multiple movement mechanisms with different movement mechanism types. The movement mechanisms 114 are coupled to movable object 102 (or vice-versa) using any suitable means, such as support elements (e.g., drive shafts) and/or other actuating elements (e.g., the movable object actuators 212). For example, a movable object actuator 212 receives control signals from the processor(s) 202 (e.g., via the control bus 208) that activates the movable object actuator 212 to cause movement of a movement mechanism 114. For example, the processor(s) 202 include an electronic speed controller that provides control signals to a movable object actuator 212.

In some embodiments, the movement mechanisms 114 enable the movable object 102 to take off vertically from a surface or land vertically on a surface without requiring any horizontal movement of the movable object 102 (e.g., without traveling down a runway). In some embodiments, the movement mechanisms 114 are operable to permit the movable object 102 to hover in the air at a specified position and/or orientation. In some embodiments, one or more of the movement mechanisms 114 are controllable independently of one or more of the other movement mechanisms 114. For example, when the movable object 102 is a quadcopter, each rotor of the quadcopter is controllable independently of the other rotors of the quadcopter. In some embodiments, multiple movement mechanisms 114 are configured for simultaneous movement.

In some embodiments, the movement mechanisms 114 include multiple rotors that provide lift and/or thrust to the movable object 102. The multiple rotors are actuated to provide, e.g., vertical takeoff, vertical landing, and hovering capabilities to the movable object 102. In some embodiments, one or more of the rotors spin in a clockwise direction, while one or more of the rotors spin in a counterclockwise direction. For example, the number of clockwise rotors is equal to the number of counterclockwise rotors. In some embodiments, the rotation rate of each of the rotors is independently variable, e.g., for controlling the lift and/or thrust produced by each rotor, and thereby adjusting the spatial disposition, velocity, and/or acceleration of the movable object 102 (e.g., with respect to up to three degrees of translation and/or up to three degrees of rotation).

In some embodiments, the memory 204 stores one or more programs (e.g., sets of instructions), modules, and/or data structures. One or more elements described with regard to the memory 204 are optionally stored by the control unit 108, the computing device 110, and/or another device. In some embodiments, imaging device 302 includes memory that stores one or more parameters described with regard to the memory 204.

In some embodiments, the memory 204 stores a system configuration that includes one or more system settings (e.g., as configured by a manufacturer, administrator, and/or user). For example, identifying information for the movable object 102 is stored as a system setting of the system configuration. In some embodiments, the system configuration includes an imaging device configuration. The imaging device configuration stores parameters for the optical device 306 such as initial position, initial step size, zoom level and/or focus parameters (e.g., amount of focus, selecting autofocus or manual focus, and/or adjusting an autofocus target in an image). Imaging property parameters stored by the imaging device configuration include, e.g., image resolution, image size (e.g., image width and/or height), aspect ratio, pixel count, quality, focus distance, depth of field, exposure time, shutter speed, and/or white balance. In some embodiments, parameters stored by the imaging device configuration are updated in response to control instructions (e.g., received by the movable object 102 from control unit 108 and/or the computing device 110). In some embodiments, parameters stored by the imaging device configuration are updated in response to information received from the movable object sensing system 210 and/or the imaging device 302.

In some embodiments, the memory 204 includes an imaging device adjustment module. The imaging device adjustment module stores, e.g., instructions for adjusting a distance between an image sensor 304 and an optical device 306 of an imaging device 302.

The above identified modules or programs (i.e., sets of instructions) need not be implemented as separate software programs, procedures or modules, and thus various subsets of these modules may be combined or otherwise re-arranged in various embodiments. In some embodiments, the memory 204 may store a subset of the modules and data structures identified above. Furthermore, the memory 204 may store additional modules and data structures not described above. In some embodiments, the programs, modules, and data structures stored in the memory 204, or a non-transitory computer readable storage medium of memory 204, provide instructions for implementing respective operations in the methods described below. In some embodiments, some or all of these modules may be implemented with specialized hardware circuits that subsume part or all of the module functionality. One or more of the above identified elements may be executed by one or more processors 202 of the movable object 102. In some embodiments, one or more of the above identified elements is executed by one or more processors of a device remote from the movable object 102, such as processor(s) of control unit 108 and/or processor(s) of computing device 110.

The communication system 206 enables communication with the control unit 108 and/or the computing device 110, e.g., via wireless signals 112. The communication system 206 includes, e.g., transmitters, receivers, and/or transceivers for wireless communication. In some embodiments, the communication is one-way communication, such that data is only received by the movable object 102 from the control unit 108 and/or the computing device 110, or vice-versa. In some embodiments, communication is two-way communication, such that data is transmitted in both directions between the movable object 102 and the control unit 108 and/or the computing device 110. In some embodiments, the movable object 102, the control unit 108, and/or the computing device 110 are connected to the Internet 116 or other telecommunications network, e.g., such that data generated by the movable object 102, the control unit 108, and/or the computing device 110 is transmitted to a server for data storage and/or data retrieval (e.g., for display by a website).

In some embodiments, the sensing system 210 of the movable object 102 includes one or more sensors. In some embodiments, one or more sensors of the movable object sensing system 210 are mounted to the exterior, located within, or otherwise coupled to the movable object 102. In some embodiments, one or more sensors of the movable object sensing system 210 are components of the carrier 104, the payload 106, and or the imaging device 302. Where sensing operations are described herein as being performed by the movable object sensing system 210, it will be recognized that such operations are optionally performed by one or more sensors of the carrier 104, the payload 106, and or the imaging device 302 in addition to or in lieu of one or more sensors of the movable object sensing system 210.

The movable object sensing system 210 generates static sensing data (e.g., a single image captured in response to a received instruction) and/or dynamic sensing data (e.g., a series of images captured at a periodic rate, such as a video).

Figure 3:
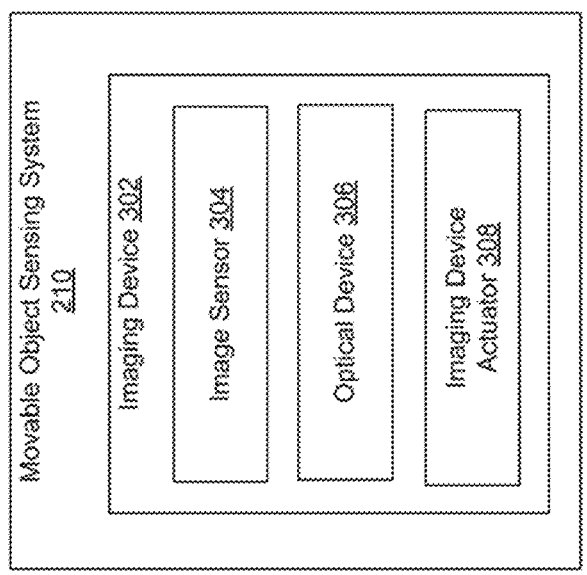
FIG. 3 illustrates an exemplary movable object sensing system, in accordance with some embodiments.

In some embodiments, the movable object sensing system 210 includes an image sensor 304. For example, the movable object sensing system 210 includes an image sensor 304 that is a component of an imaging device 302, such as a camera (FIG. 3). In some embodiments, the movable object sensing system 210 includes multiple image sensors, such as a pair of image sensors for stereographic imaging (e.g., a left stereographic image sensor and a right stereographic image sensor).

In some embodiments, the movable object sensing system 210 includes one or more audio transducers. For example, an audio detection system includes an audio output transducer (e.g., a speaker) and/or an audio input transducer (e.g., a microphone, such as a parabolic microphone). In some embodiments, microphone and a speaker are used as components of a sonar system. A sonar system is used, for example, to provide a three-dimensional map of the surroundings of the movable object 102.

In some embodiments, the movable object sensing system 210 includes one or more infrared sensors. In some embodiments, a distance measurement system for measuring a distance from the movable object 102 to an object or surface includes one or more infrared sensors, such a left infrared sensor and a right infrared sensor for stereoscopic imaging and/or distance determination.

In some embodiments, the movable object sensing system 210 includes one or more global positioning system (GPS) sensors, motion sensors (e.g., accelerometers), rotation sensors (e.g., gyroscopes), inertial sensors, proximity sensors (e.g., infrared sensors) and/or weather sensors (e.g., pressure sensor, temperature sensor, moisture sensor, and/or wind sensor).

In some embodiments, sensing data generated by one or more sensors of the movable object sensing system 210 and/or information determined using sensing data from one or more sensors of the movable object sensing system 210 is used as a depth sensor for depth detection, e.g., the image sensor, the audio sensor, and/or the infrared sensor are used to determine a distance from the movable object 102 to another object, such as a target, an obstacle, and/or terrain.

In some embodiments, sensing data generated by one or more sensors of the movable object sensing system 210 and/or information determined using sensing data from one or more sensors of the movable object sensing system 210 are transmitted to the control unit 108 and/or the computing device 110 (e.g., via the communication system 206). In some embodiments, data generated by one or more sensors of the movable object sensing system 210 and/or information determined using sensing data from one or more sensors of the movable object sensing system 210 is stored by the memory 204.

In some embodiments, the movable object 102, the control unit 108, and/or the computing device 110 use sensing data generated by sensors of the sensing system 210 to determine information such as a position of the movable object 102, an orientation of the movable object 102, movement characteristics of the movable object 102 (e.g., angular velocity, angular acceleration, translational velocity, translational acceleration and/or direction of motion along one or more axes), and/or proximity of the movable object 102 to potential obstacles, targets, weather conditions, locations of geographical features and/or locations of manmade structures.

Figure 2B:
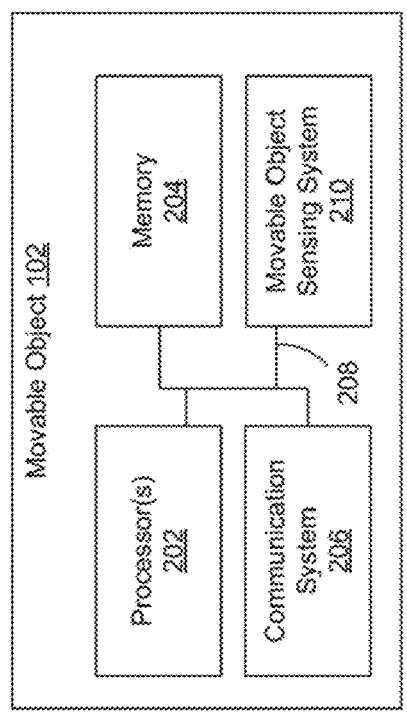
FIG. 2B illustrates a movable object in the movable object environment of FIG. 1B, in accordance with some embodiments.

FIG. 2B illustrates an exemplary movable object 102 in a movable object environment 150, in accordance with some embodiments. A movable object 102 in the movable object environment 150 is moved by a movement mechanism 114 that is remote from the movable object 102 (e.g., as described with regard to FIG. 1B). The movable object 102 of the movable object environment 150 includes, e.g., one or more processing units 202, a memory 204, a sensing system 210, and/or a communication bus 208 for interconnecting these components. In some embodiments, the movable object 102 is communicatively coupled to a control unit 108, e.g., via a communication system 206.

FIG. 3 illustrates an exemplary sensing system 210 of the movable object 102, in accordance with some embodiments. In some embodiments, the movable object sensing system 210 includes an imaging device 302 (e.g., a camera). In some embodiments, the imaging device 302 is a component of the payload 106. The imaging device 302 includes an image sensor 304 and an optical device 306. In some embodiments, the optical device 306 is moved relative to the imaging device 302 by an imaging device actuator 308.

The image sensor 304 is, e.g., a sensor that detects light, such as visible light, infrared light, and/or ultraviolet light. In some embodiments, the image sensor 304 includes, e.g., semiconductor charge-coupled devices (CCD), active pixel sensors using complementary metal-oxide-semiconductor (CMOS) and/or N-type metal-oxide-semiconductors (NMOS, Live MOS).

The optical device 306 affects the focus of light that arrives at the image sensor 304. For example, the optical device 306 is a lens or a device including multiple lenses (e.g., a compound lens). A lens is, e.g., a material having curved surfaces that give rise to lens properties, such as causing light rays to converge (e.g., at a focal length) and/or diverge.

The imaging device actuator 308 is, e.g., a motor, such as a hydraulic, pneumatic, electric, thermal, magnetic, and/or mechanical motor. In some embodiments, imaging device actuator 308 translates an optical device 306 along one or more axes relative to the image sensor 304 of the imaging device 302. In some embodiments, the imaging device actuator 308 moves the optical device 306 in response to optical control instructions received from a processor (e.g., processor(s) 202). For example, the imaging device actuator 308 moves the optical device 306 in response to optical control instructions generated in response to user input (e.g., user input received via an input device of the control unit 108 to initiate an image capture and/or autofocus process).

Figure 4:
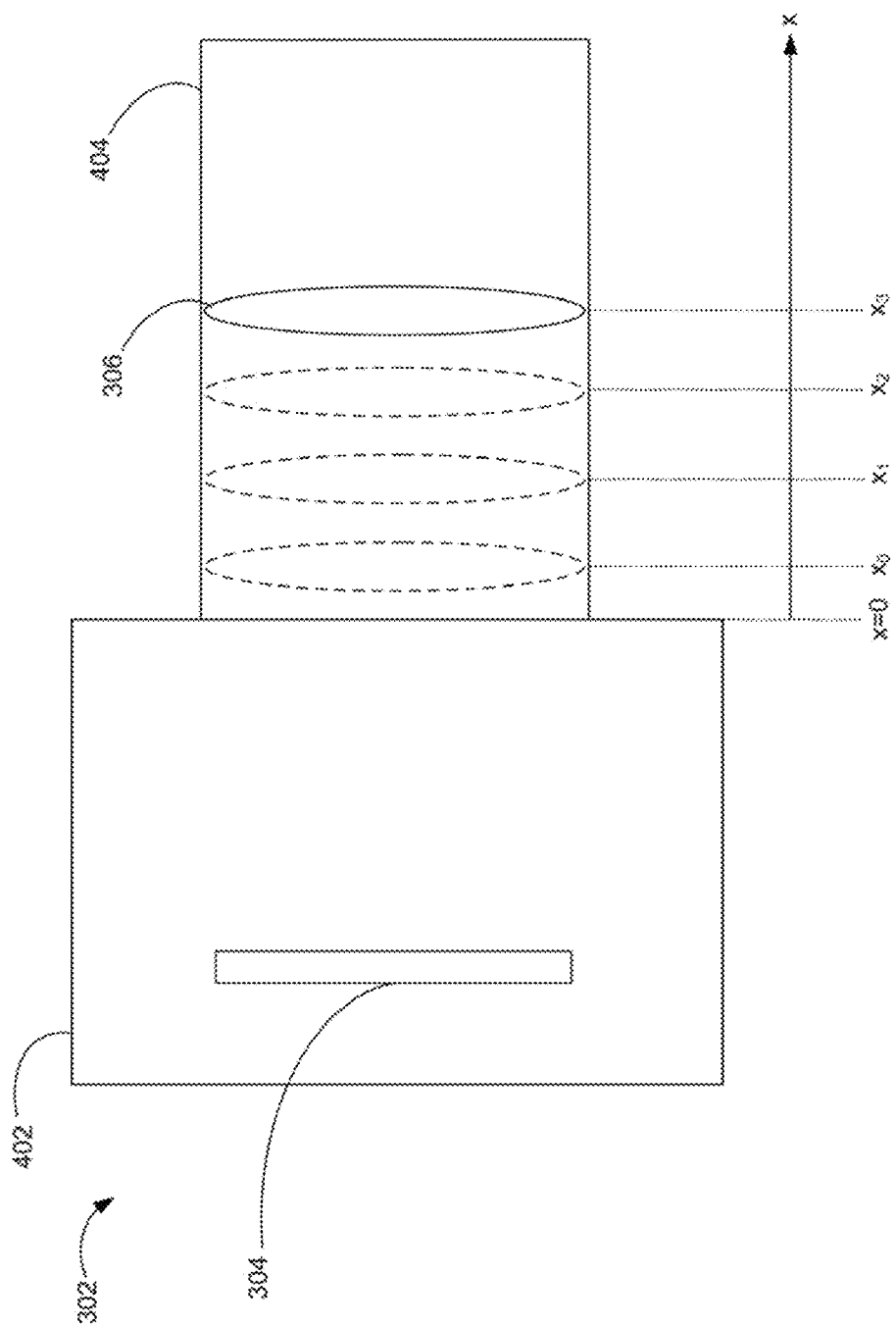
FIG. 4 is a cross sectional view of an exemplary imaging device, in accordance with some embodiments.

FIG. 4 is a cross sectional view of an exemplary imaging device 302, in accordance with some embodiments. In some embodiments, the imaging device 302 includes a camera body 402. The camera body 402 is, e.g., a body of the movable object 102, a body mounted on and/or inside of the movable object 102, a body coupled to the carrier 104 (e.g., as a payload 106), and/or a body coupled to a payload 106. The camera body 402 is, e.g., a structure to which an image sensor 304 is coupled. The camera body 402 includes a camera body opening that admits light into the camera body 402. In some embodiments, the camera body 402 is fabricated from a material that reduces or eliminates light penetration such that the camera body 402 admits light only at the camera body opening (e.g., via the optical device 306 and/or the camera lens 404). In some embodiments, the optical device 306 and/or the camera lens 404 is mounted over an opening of camera body 402.

In some embodiments, an optical device 306 is coupled (e.g., fixedly, movably, and/or interchangeably mounted) to camera body 402. Although in FIG. 4 the optical device 306 is depicted as a single lens that moves relative to the camera body 402, in some embodiments, the optical device 306 is a camera lens 404 (e.g., an optical device that is fixedly and/or detachably mounted to the camera body 402) that includes one or more optical elements (e.g., lenses) that move relative to the image sensor 304. In some embodiments, the optical device 306 is mounted on the interior of the camera body 402.

The optical device 306 moves relative to the image sensor 304 along an x-axis. In FIG. 4, the optical device 306 is shown (with dotted lines indicating past positions of the optical device 306) at a first position $x_0$ that is at a first separation distance between the optical device 306 and the image sensor 304, a second position $x_1$ that is at a second separation distance between optical device 306 and the image sensor 304, and a third position $x_2$ that is at a third separation distance between the optical device 306 and the image sensor 304. Optical device 306 is shown (with solid lines indicating a current position of the optical device 306) at a fourth position $x_3$ that is at a fourth separation distance between the optical device 306 and the image sensor 304. In some embodiments, during an autofocus operation, a first image is captured at first position $x_0$, a second image is captured at second position $x_1$, a third image is captured at third position $x_2$, a fourth image is captured at fourth position $x_3$, and so on.

In some embodiments, the optical device 306 is moved relative to the image sensor 304 to focus an image captured by the image sensor 304. For example, the optical device 306 is moved relative to the image sensor 304 during an autofocus operation. In some embodiments, the autofocus operation is a contrast detection autofocus operation. The contrast detection autofocus operation includes, e.g., determining a contrast variation rate for an image captured by the image sensor 304. As the contrast variation rate increases, the focus of the image captured by the image sensor 304 improves. During the autofocus operation, when the optical device 306 is moved relative to the image sensor 304, a contrast variation rate is determined (e.g., based on an image captured by the image sensor 304 and at least one previous captured image). In accordance with some embodiments as described below, the contrast variation rate is used to determine a step size for approaching a separation distance between the image sensor 304 and the optical device 306 at which the image is focused. In some embodiments, by determining a new step size after capturing a new image during the autofocus process, autofocus can be achieved by gradually approaching a focus separation distance (e.g., an estimated separation distance between the image sensor 304 and the optical device 306 at which focus is achieved, substantially achieved, and/or maximized). The new step size is, e.g., an increased step size (e.g., when the current separation distance is relatively far from the focus separation distance) or a decreased step size (e.g., when the current separation is relatively close to the focus separation distance). In some embodiments, the focus of the image captured by the image sensor 304 is iteratively improved such that the focus separation distance is approached and/or reached without the need to overshoot the focus separation distance. In this way, movement of components of the movable object 102, such as the optical device 306 and/or the image sensor 304, is reduced in comparison with autofocus techniques that rely on less precise movements and/or overshoot of a focus separation distance.

Figure 5:
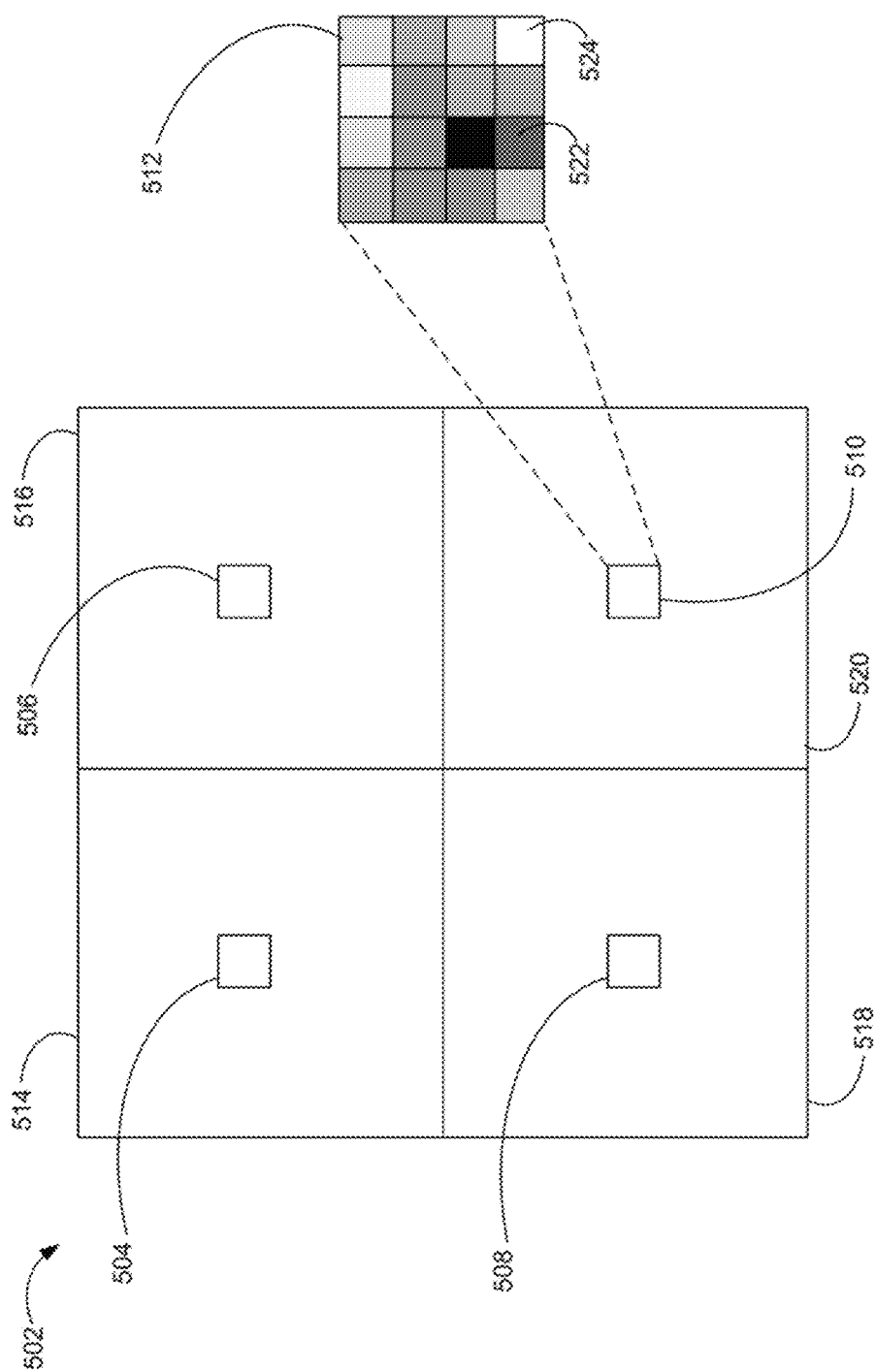
FIG. 5 illustrates contrast variation determination for an exemplary image captured by an image sensor, in accordance with some embodiments.

FIG. 5 illustrates contrast variation determination for an exemplary image 502 captured by the image sensor 304, in accordance with some embodiments. In some embodiments, a contrast gradient is captured across one or more portions of the image 502. A portion of the image 502 is, e.g., a subset of pixels of the image 502, such as a 16×16 array of pixels or a 4×4 array of pixels. In some embodiments, an image is divided into four quadrants and subsets of pixels are selected from one or more quadrants of the image. For example, the image 502 includes subsets of pixels 504, 506, 508, and 510 corresponding to quadrants 514, 516, 518 and 520, respectively, of the image 502.

The pixel array 512 illustrates a 4×4 array of pixels corresponding to the subset of pixels 510. The pixel array 512 includes pixels with a variety of luminance values. For example, the pixel 522 has a low luminance value relative to the pixel 524. A luminance gradient across the pixels of the pixel array 512 is determined based on a variation in luminance across the pixel array 512. For example, a luminance gradient value for the pixel subset 510 is determined as follows:

$$\frac{\text{Highest luminance value for pixel array} - \text{lowest luminance value for pixel array}}{\text{number of pixels in pixel array}} \quad (1)$$

In some embodiments, determining a contrast value for the image 502 includes determining an average of luminance gradients for the pixel subsets 504, 506, 508, and 510. For example, a contrast value for the image 502 is determined as follows:

$$\frac{\sum \text{luminance gradients for pixel subsets in image}}{\text{number of pixel subsets in image}} \quad (2)$$

In some embodiments, a contrast value is determined using a pixel subset at a position corresponding to a location in the image 502 designated by a user (e.g., designated by input provided via the control unit 108 and/or the computing device 110). In some embodiments, a contrast value is determined using a pixel subset at a position corresponding to a target or a portion of a target being tracked by the movable object 102 as captured in the image 502 (e.g., a target designated by input provided via the control unit 108 and/or the computing device 110). In some embodiments, a contrast value is determined using luminance values of all pixels of the image 502.

Figure 6:
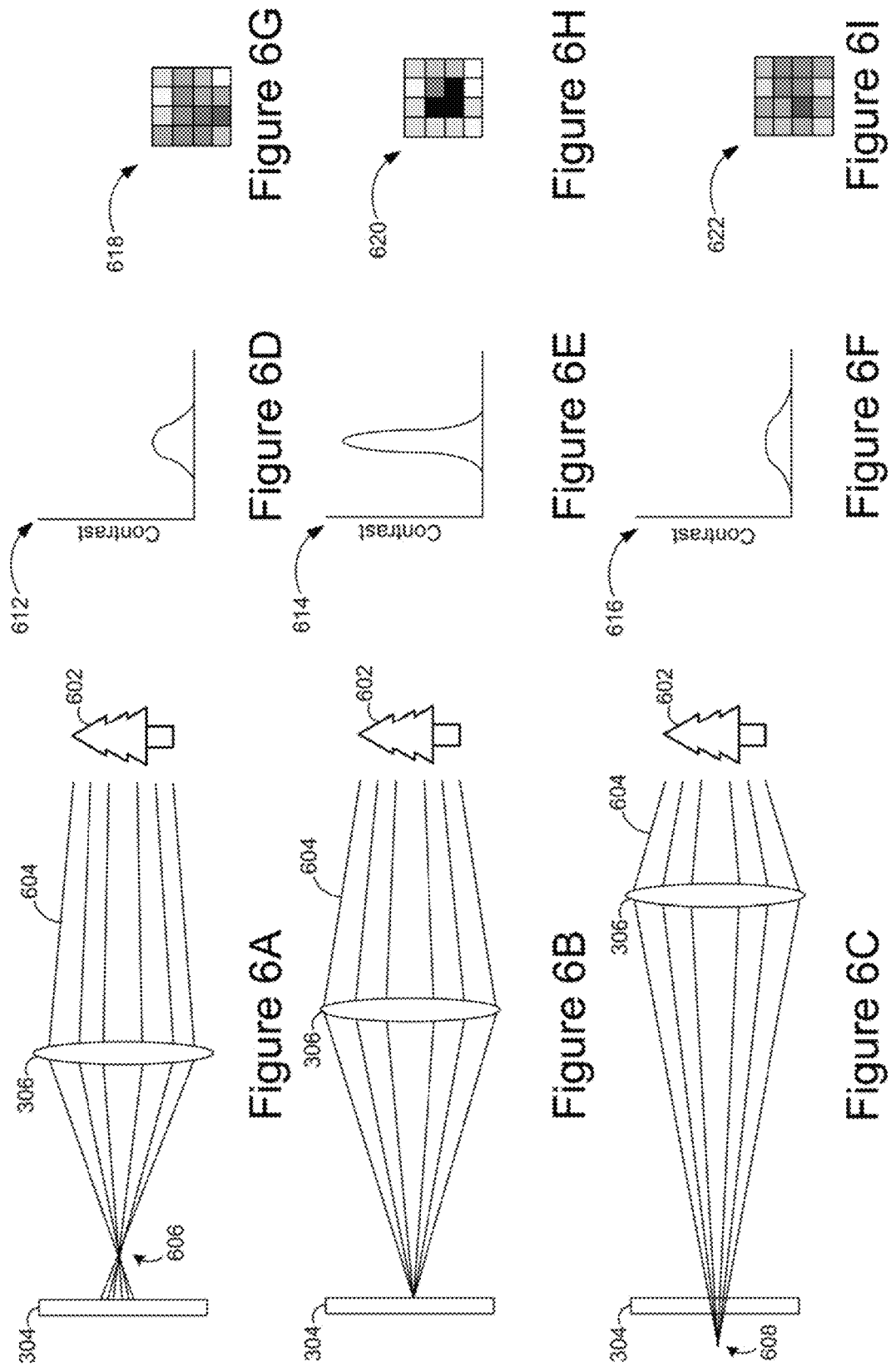
FIGS. 6A-6C illustrate a simplified representation of locations at which light rays corresponding to an object converge based on various separation distances between an optical device and an image sensor, in accordance with some embodiments.
FIGS. 6D-6F illustrate contrast distributions corresponding to the respective separation distances illustrated in FIGS. 6A-6C, in accordance with some embodiments.
FIG. 6G-6I illustrate pixel arrays corresponding to the respective separation distances illustrated in FIGS. 6A-6C, in accordance with some embodiments.

FIGS. 6A-6C illustrate a simplified representation of locations at which light rays corresponding to the object 602 converge based on various separation distances between the optical device 306 and the image sensor 304, in accordance with some embodiments. FIGS. 6D-6F illustrate contrast distributions corresponding to the respective separation distances illustrated in FIGS. 6A-6C, in accordance with some embodiments. FIGS. 6G-6I illustrate pixel arrays corresponding to the respective separation distances illustrated in FIGS. 6A-6C, in accordance with some embodiments.

Typically, an image is in focus when the contrast value in the image is maximized. In some embodiments, an autofocus operation that uses contrast value determination includes iteratively adjusting a separation distance between the optical device 306 and the image sensor 304 as a contrast value reaches a maximum value.

In FIGS. 6A and 6C, an image 502 of an object 602 captured by the image sensor 304 is out of focus. In FIG. 6A, light rays 604 corresponding to the object 602 converge at a position 606 in front of the image sensor 304 (e.g., to the right of the image sensor 304 as illustrated in FIG. 6A). In FIG. 6C, light rays 602 converge at a position 608 behind the image sensor 304 (e.g., to the left of the image sensor 304 as illustrated in FIG. 6C). In FIG. 6B, an image 502 captured by the image sensor 304 is in focus because light rays 604 converge at a position corresponding to the position of the image sensor 304.

FIG. 6D illustrates a contrast distribution 612 across a portion of an image 502 (e.g., at a pixel array 512). The contrast distribution 612 of FIG. 6D corresponds to the separation distance of the optical device 306 and the image sensor 304 shown in FIG. 6A. FIG. 6E illustrates a contrast distribution 614 across a portion of an image 502 captured when the separation distance of the optical device 306 and the image sensor 304 are as shown in FIG. 6B. FIG. 6F illustrates a contrast distribution 616 across a portion of an image 502 captured when the separation distance of the optical device 306 and the image sensor 304 is as shown in FIG. 6C.

FIG. 6G illustrates a subset of pixels 618 from an image 502 captured by the image sensor 304, corresponding to the separation distance of the optical device 306 and the image sensor 304 shown in FIG. 6A. FIG. 6H illustrates a subset of pixels 620 from an image captured by the image sensor 304, corresponding to the separation distance of the optical device 306 and the image sensor 304 shown in FIG. 6B. FIG. 6I illustrates a subset of pixels 622 from an image captured by the image sensor 304, corresponding to the separation distance of the optical device 306 and the image sensor 304 shown in FIG. 6C. Compared with contrast values of the pixel array 622 and the pixel array 618, the contrast value of the pixel array 620 is high, demonstrating that the difference between the highest-luminance pixels and lowest-luminance pixels increases as focus improves. This is also demonstrated by the steepness of the slope of the contrast distribution 614 relative to contrast distributions 612 and 616.

Figure 7:
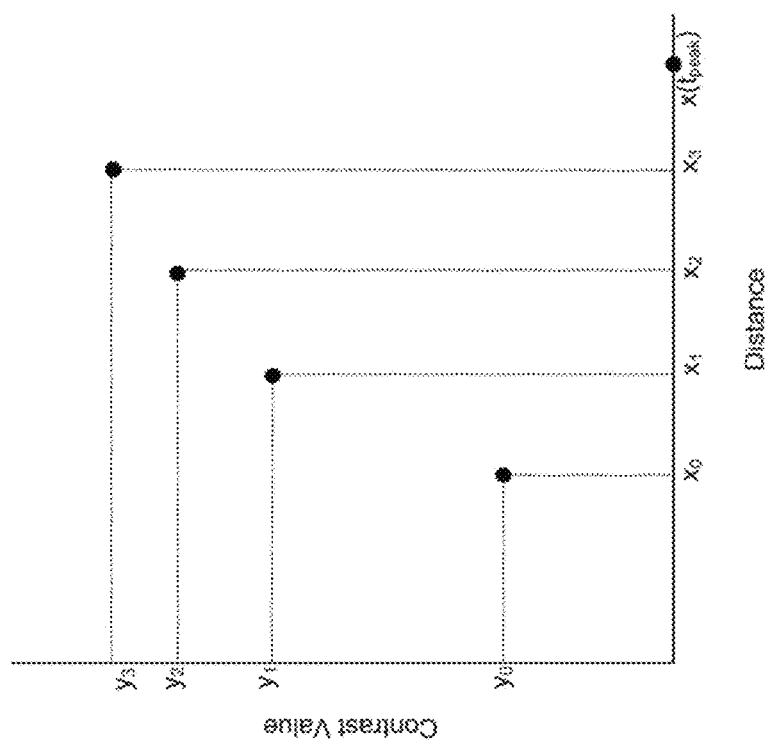
FIG. 7 illustrates exemplary contrast values obtained for images captured at various distances between an optical device and an image sensor, in accordance with some embodiments.

FIG. 7 illustrates contrast values $y_0$, $y_1$, $y_2$, and $y_3$ obtained from images captured at separation distances $x_0$, $x_1$, $x_2$, and $x_3$, respectively, between the optical device 306 and the image sensor 304. For example, separation distances $x_0$, $x_1$, $x_2$, and $x_3$ of FIG. 7 are separation distances $x_0$, $x_1$, $x_2$, and $x_3$, described with regard to FIG. 4.

In some embodiments, a curve is generated based on determined contrast values $y_0$, $y_1$, $y_2$, and $y_3$. For example, a generated curve is used to estimate a peak contrast value (e.g., an estimated contrast value $y_{peak}$ corresponding to a focus separation distance $x_{peak}$ between the optical device 306 and the image sensor 304. In some embodiments, the generated curve is a Bezier curve, such as a cubic Bezier curve. For example, a generated cubic Bezier curve is determined for $(x_0, y_0)$, $(x_1, y_1)$, $(x_2, y_2)$, $(x_3, y_3)$ as follows:

Cubic Bézier curve: (3)

$$\begin{cases} y(t) = y_0(1-t)^3 + 3y_1t(1-t)^2 + 3y_2t^2(1-t) + y_3t^3 \\ x(t) = x_0(1-t)^3 + 3x_1t(1-t)^2 + 3x_2t^2(1-t) + x_3t^3 \end{cases}$$

In some embodiments, e.g., after the separation distance between the optical device 306 and the image sensor 304 is increased by a next step value $s_n$ such that a contrast value $y_n$ is determined at a separation distance $x_n$ between the optical device 306 and the image sensor 304, a nonlinear least squares analysis is used to find a best fit curve to $(x_0, y_0)$, $(x_1, y_1)$, $(x_2, y_2)$, $(x_3, y_3)$ ... $(x_n, y_n)$.

Figure 8A:
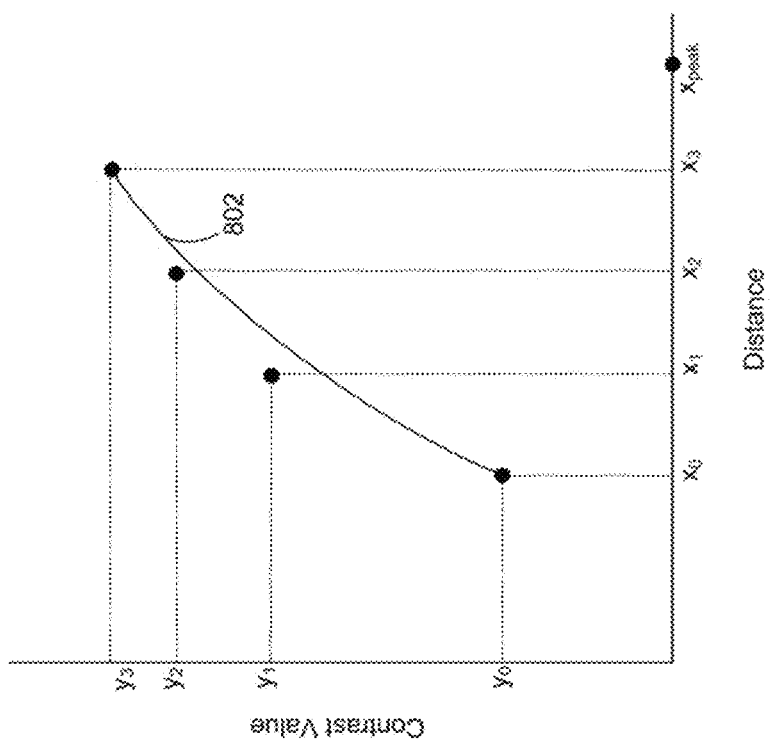
FIG. 8A illustrates a cubic Bézier curve determined for obtained contrast values, in accordance with some embodiments.

FIG. 8A illustrates a cubic Bezier curve 802 determined for $(x_0, y_0)$, $(x_1, y_1)$, $(x_2, y_2)$, $(x_3, y_3)$. An estimated point at which the contrast value is at a maximum $y_{peak}$ (the peak of the curve) corresponds to a point at which the derivative of the curve 802 is equal to zero. To obtain $y_{peak}$, the value $t_{peak}$ (e.g., the value of t when y'(t) of the cubic Bezier curve is equal to zero) is determined:

$$-3t_{peak}^2(y_0-3y_1+3y_2-y_3)+6t_{peak}(y_0-2y_1+y_2)-3(y_0-y_1)=0 \quad (4)$$

To obtain $x_{peak}$, the determined value of t from (4) is used in (5):

$$x(t_{peak})=x_0(1-t_{peak})^3+3x_1t_{peak}(1-t_{peak})^2+3x_2t_{peak}^2(1-t_{peak})+x_3t_{peak}^3 \quad (5)$$

Figure 8B:
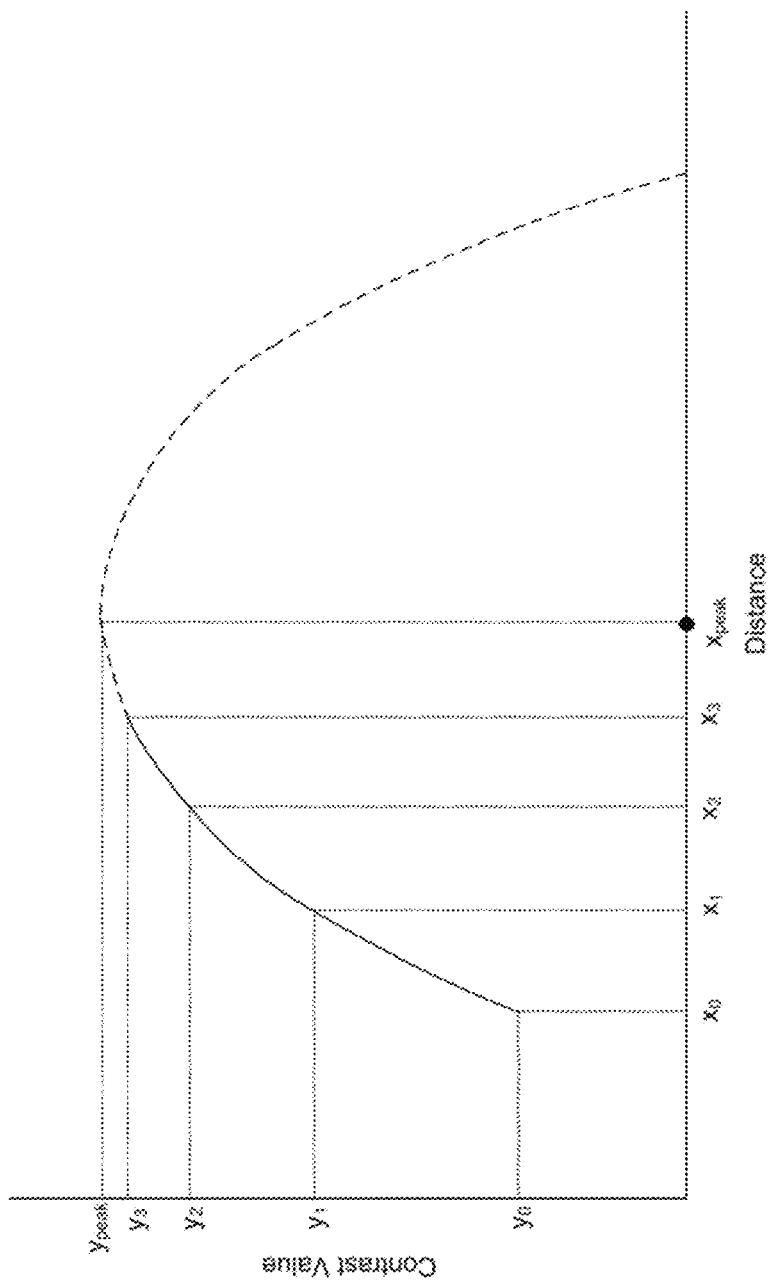
FIG. 8B illustrates determined values corresponding to an estimated distance between an optical device and an image sensor at which an image captured by image sensor will be focused, in accordance with some embodiments.

FIG. 8B illustrates determined values $(x_{peak}, y_{peak})$ corresponding to an estimated focus separation distance between the optical device 306 and the image sensor 304, in accordance with some embodiments.

In some embodiments, the determined $x_{peak}$ value is used for determining an increased next step value $s_n$, as indicated below:

$$\text{Increased step size: } s_n = \frac{1 + (x_{peak} - x_c)}{\text{total length}}(x_3 - x_2) \quad (6)$$

The value of "total length" in equation (6) is, for example, a maximum separation distance between the optical device 306 and the image sensor 304 (e.g., as constrained by the camera body 402 and/or the camera lens 404) A current separation distance between the optical device 306 and the image sensor 304 is indicated by $x_c$.

Figure 8C:
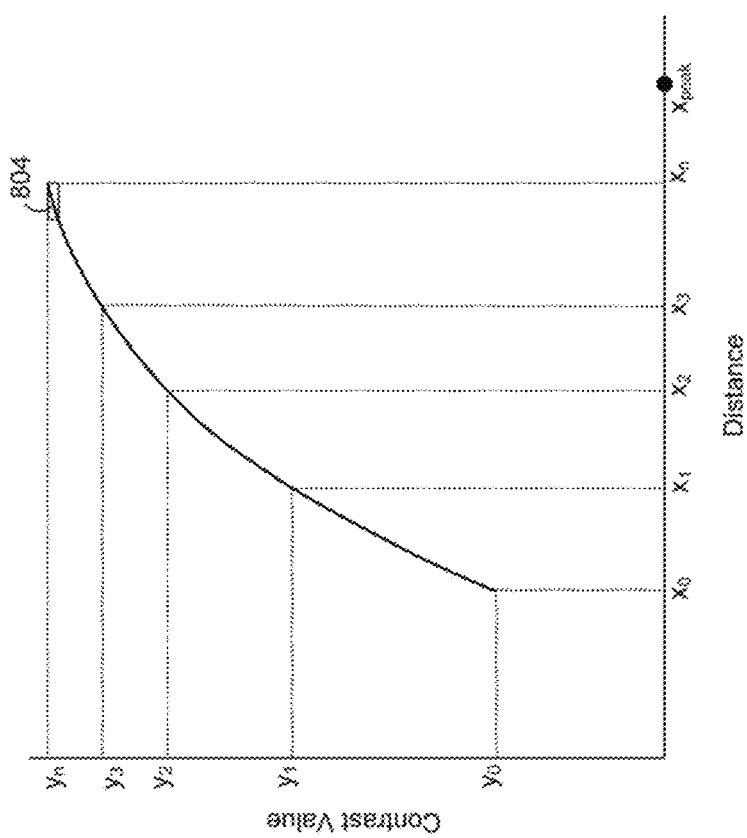
FIG. 8C illustrates a contrast value determined after the distance between an optical device and an image sensor has been increased by a determined step size, in accordance with some embodiments.

In some embodiments, when next step value $s_n$ has been determined, the separation distance between the optical device 306 and the image sensor 304 is increased from $x_c$ by the value $s_n$, such that the distance between the optical device 306 and the image sensor 304 is increased to $x_n$ (e.g., as shown in FIG. 8C). In some embodiments, when the separation distance between the optical device 306 and the image sensor 304 has been increased to a next distance $x_n$, an image 502 is captured and a next contrast value $y_n$ is determined.

FIG. 8C illustrates a contrast value $y_n$ determined after the distance between the optical device 306 and the image sensor 304 has been increased to a distance $x_n$.

In some embodiments, when a contrast value $y_n$ has been determined, a contrast variation rate 804 (e.g., dy/dx) is determined at the point $x_n$. For example, the contrast variation rate 804 is determined as follows:

$$\frac{dy}{dx} = \frac{y_n - y_{previous}}{x_n - x_{previous}} \quad (7)$$

In the illustrative example of FIG. 8C, $x_{previous}$ is $x_3$ and $y_{previous}$ is $y_3$.

In some embodiments, when a contrast variation rate has been determined, the contrast variation rate is compared with one or more threshold values. For example, a contrast variation rate is compared with a first threshold value (e.g., threshold A) to determine whether a next step size will be an increased step size or a decreased step size. In accordance with a determination that the contrast variation rate meets a first threshold criterion (e.g., the contrast variation rate is greater than threshold A), the next step size will be an increased step size. In accordance with a determination that the contrast variation rate does not meet the first threshold criterion (e.g., the contrast variation rate is less than or equal to threshold A), if a next step will be taken, the next step size will be an decreased step size determined as follows:

$$\text{Decreased step size: } s_n = \frac{1 - (x_{peak} - x_c)}{\text{total length}} (x_3 - x_2) \quad (8)$$

Figure 8D:
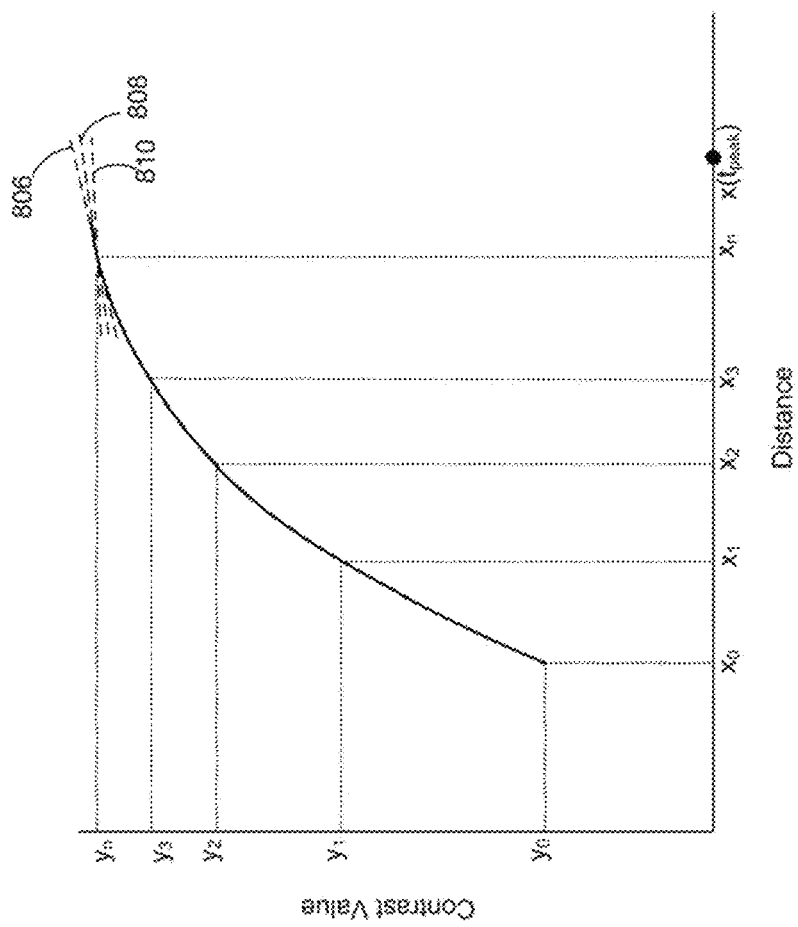
FIG. 8D illustrates various threshold values to which determined contrast variation rates are compared, in accordance with various embodiments.

FIG. 8D illustrates various threshold values to which determined contrast variation rates are compared, in accordance with various embodiments. A first threshold 806 (e.g., threshold A) has a first gradient (e.g., slope value), a second threshold 808 (e.g., threshold B) has a second gradient, and a third threshold 810 has a third gradient. In some embodiments, the absolute value of the gradient of threshold B is lower than the absolute value of the gradient of threshold A and the absolute value of the gradient of threshold C is lower than the absolute value of the gradient of threshold C.

In some embodiments, the contrast variation rate 804 as shown in FIG. 8C is compared with the first threshold 806 as shown in FIG. 8D. In accordance with a determination that the contrast variation rate 804 (e.g., the dy/dx value of 804) is greater than (steeper than) the first threshold 806 (threshold A) slope value, the next step size will be an increased step size determined using (6). In accordance with a determination that the contrast variation rate 804 (e.g., the dy/dx value of 804) is less than or equal to (e.g., as steep or less steep than) the first threshold 806 (threshold A) slope value, the contrast variation rate 804 is compared with the second threshold 808 (threshold B) slope value. In accordance with a determination that the contrast variation rate 804 (e.g., the dy/dx value of 804) is greater than (steeper than) the second threshold 808 (threshold B) slope value, the next step size will be a decreased step size determined using (8).

In accordance with a determination that the contrast variation rate 804 (e.g., the dy/dx value of 804) is less than or equal to (e.g., as steep or less steep than) the second threshold 808 (threshold B) slope value, a low pass filter is applied to $(x_0, y_0), (x_1, y_1), (x_2, y_2), (x_3, y_3) \ldots (X_n, y_n)$ to obtain a filtered contrast distribution, and a gradient of the filtered contrast distribution is determined at the point $x_n$ as follows:

$$\frac{dy}{dx} = \frac{y_n - y_{previous}}{x_n - x_{previous}} \quad (9)$$

In some embodiments, the gradient of the filtered contrast distribution is compared with the third threshold 810 (threshold C) slope value. In accordance with a determination that the gradient of the filtered contrast distribution is greater than (steeper than) the third threshold 810 (threshold C) slope value, one or more of the operations described with regard to FIGS. 4-8D are repeated. In accordance with a determination that the gradient of the filtered contrast distribution is less than or equal to (e.g., as steep or less steep than) the third threshold 810 (threshold C) slope value, it is determined that the focus separation distance has been achieved.

Figure 9A:
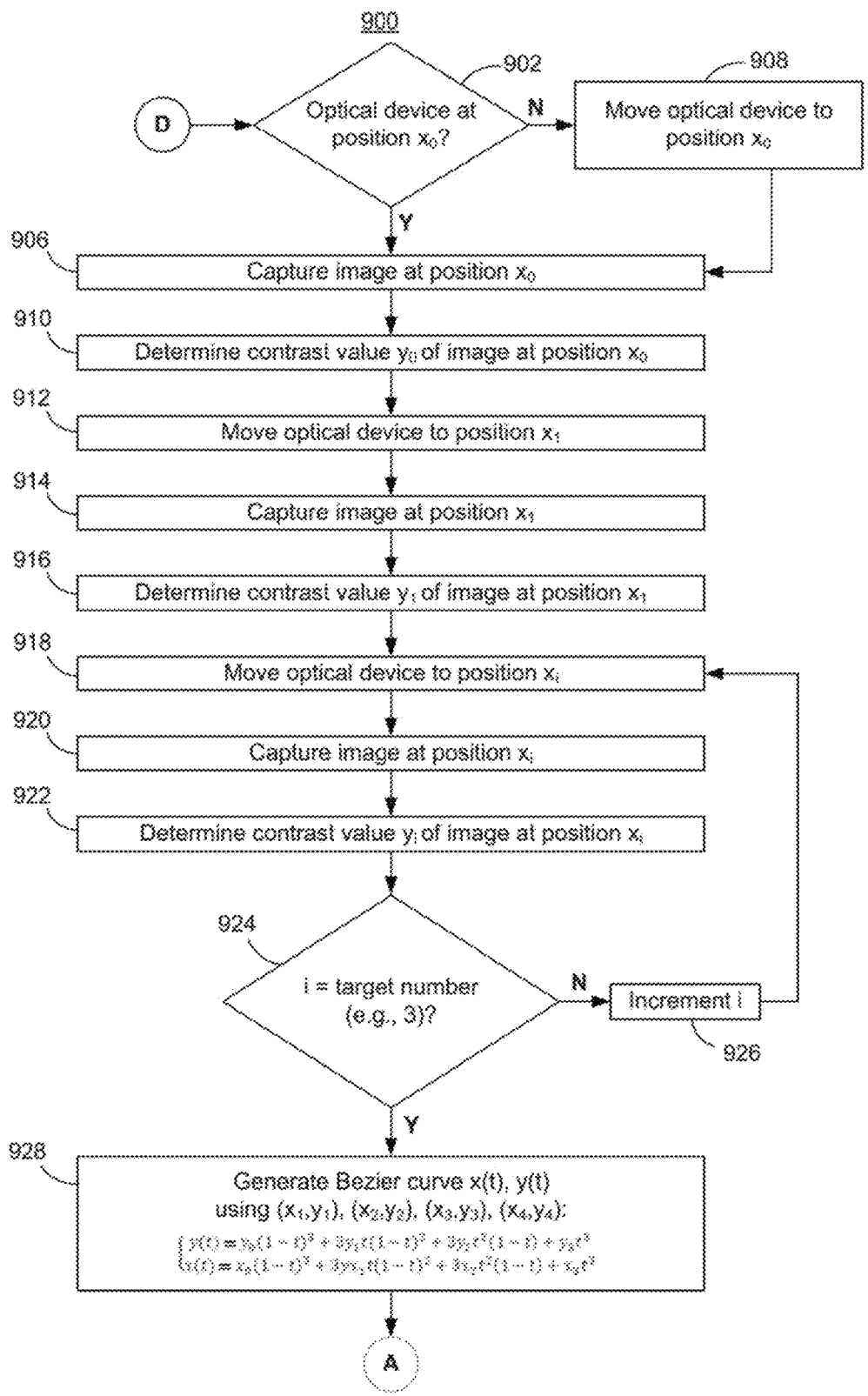
FIGS. 9A-9C are a flow diagram illustrating a method for moving an optical device relative to an image sensor to focus an image, in accordance with some embodiments.
Figure 9B:
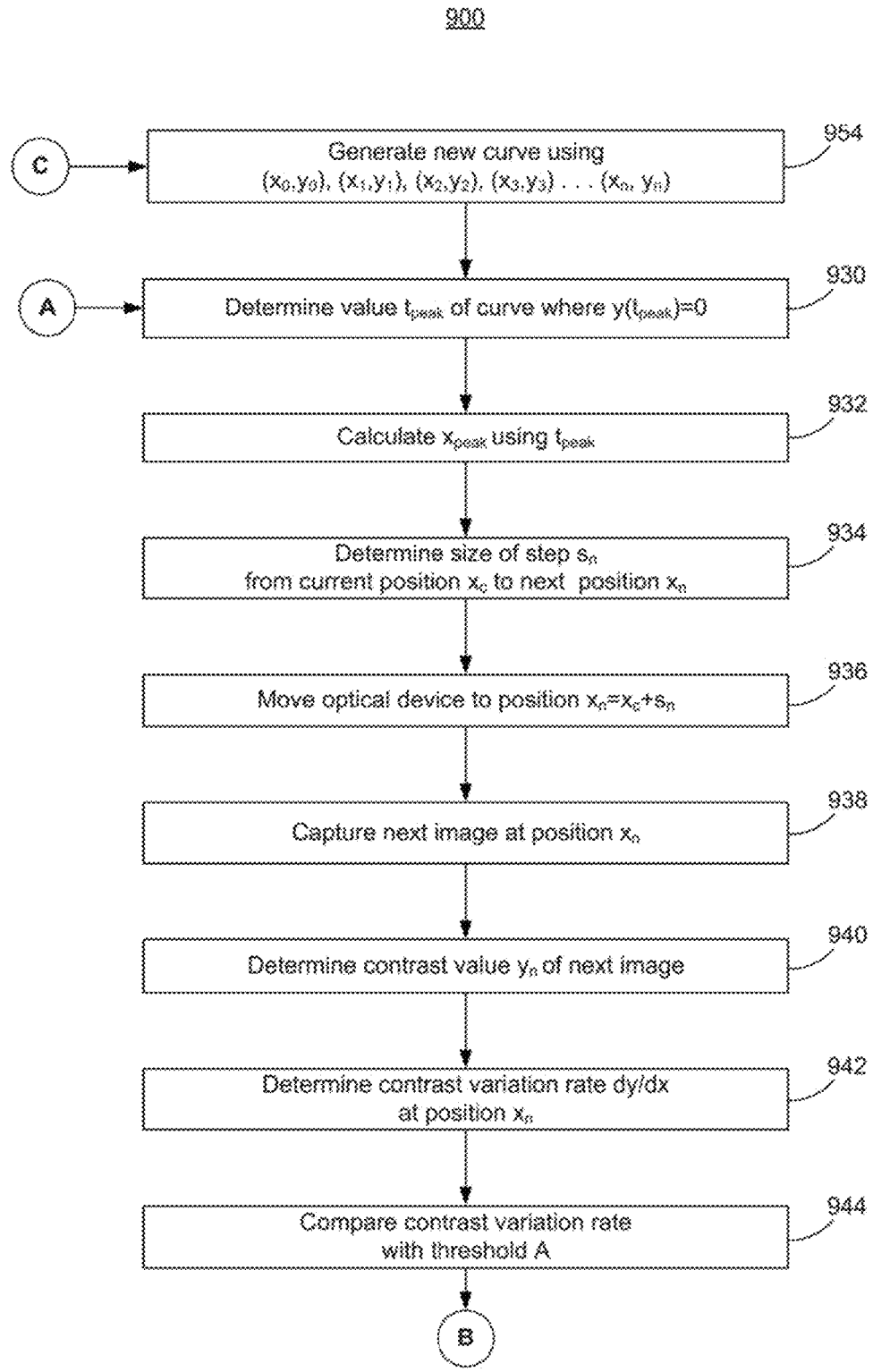
Figure 9C:
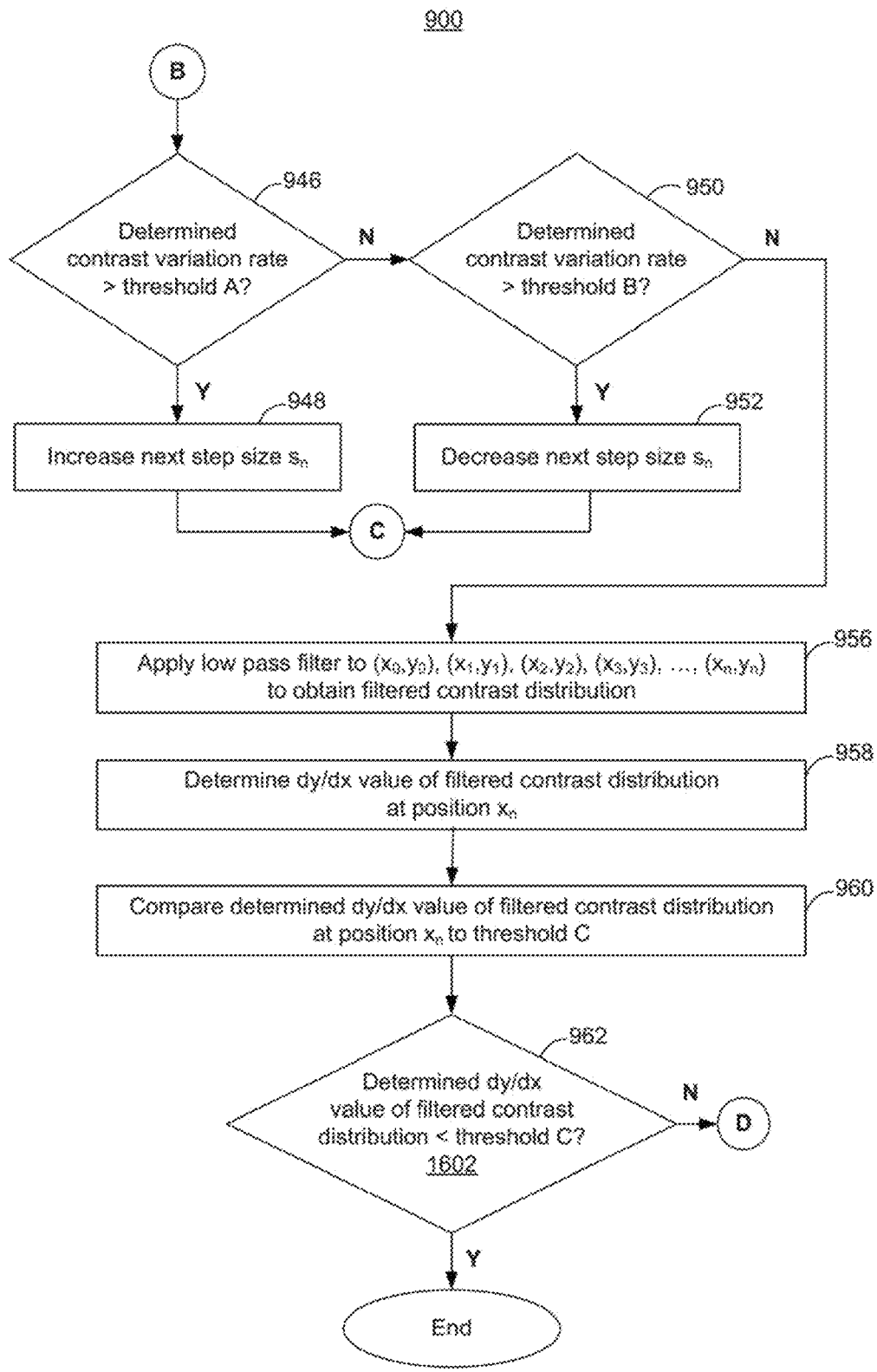

FIGS. 9A-9C are a flow diagram illustrating a method 900 for moving an optical device relative to an image sensor to focus an image, in accordance with some embodiments. The method 900 is performed at a device, such as the movable object 102, the imaging device 302, the control unit 108 and/or the computing device 110. For example, instructions for performing the method 900 are stored in the memory 204 and executed by processor(s) 202.

In some embodiments, the device determines (902) whether the optical device 306 is at an initial position (e.g., a position $x_0$ at which a separation distance between the optical device 306 and the image sensor 304 is $x_0$). In accordance with a determination that optical device 306 is at an initial position, the device captures (906) an image 502 via the image sensor 304. In accordance with a determination that the optical device 306 is not at the initial position, the device provides instructions to the imaging device actuator 308 to move (908) the optical device 306 to the initial position. The device determines (910) an initial contrast value (e.g., $y_0$) at the initial position. For example, initial contrast value $y_0$ is determined in accordance with equations (1)-(2) above.

The device provides instructions to the imaging device actuator 308 to move (912) the optical device 306 to a second position (next position, e.g., a position $x_1$ at which a separation distance between the optical device 306 and the image sensor 304 is $x_1$). The device captures (914) a second image (next image) 502 via image sensor 304 when optical device 306 is at the second position. The device determines (916) a contrast value (e.g., $y_1$) at the second position. For example, second contrast value (next contrast value) $y_1$ is determined in accordance with equations (1)-(2) above.

In some embodiments, the device provides instructions to imaging device actuator 308 to move (918) the optical device 306 to a next position (e.g., a position $x_i$ at which a separation distance between the optical device 306 and the image sensor 304 is $x_i$). For example, in a first iteration, i=2, and the position $x_i$ is $x_2$. The device captures (920) a next image 502 via image sensor 304 when optical device 306 is at the next position $x_i$. The device determines (922) a next contrast value (e.g., $y_i$) at the next position. For example, contrast value $y_i$ is determined in accordance with equations (1)-(2) above.

In some embodiments, the device determines (924) whether the number of positions (i) has reached a target number positions (e.g., a predefined target number of positions). For example, when four contrast values $y_0$, $y_1$, $y_2$, $y_3$ are needed to perform the calculation indicated at equation (3), i=3. In some embodiments, in accordance with a determination that i has not reached 3, the device (926) increments i (e.g., the device sets the value of i to be i+1). Operations 918, 920, 922, 924, and/or 926 are repeated until the device determines that the number of positions (i) has reached a target number positions (e.g. i=3). In accordance with a determination that the number of positions has reached the target number of positions (e.g., contrast values $y_0$, $y_1$, $y_2$, $y_3$ have been obtained), the device generates (928) a curve. For example, the device generates a cubic Bézier curve (e.g., 802) as indicated at equation (3).

As indicated at A, the device proceeds from operation 928 of FIG. 9A to operation 930 of FIG. 9B.

To determine a separation distance $x_{peak}$ between the image sensor 304 and the optical device 306 at which an estimated peak contrast value $y_{peak}$ occurs (e.g., as described with reference to FIGS. 8A-8B), the device determines (930) a peak value $t_{peak}$ e.g., using equation (4). The device determines (932) a distance $x_{peak}$ based on $t_{peak}$, e.g., using equation (5). The device determines (934) a next step size $s_n$, e.g., using equation (6) for an increased next step size or, (e.g., in later iterations and/or in accordance with a determination to use a decreased step size), using equation (8) for a decreased next step size. The device provides instructions to the imaging device actuator 308 to move (936) the optical device 306 from a current position $x_c$ to a next position (e.g., a position $x_n$ at which a separation distance between the optical device 306 and the image sensor 304 is $x_n = x_c + s_n$.

The device captures (938) a next image 502 when the separation distance between the optical device 306 and the image sensor 304 is $x_n$. The device determines (940) a next contrast value (e.g., $y_n$) at the next position. For example, contrast value $y_n$ is determined in accordance with equations (1)-(2) above. The device determines (942) a contrast variation rate (e.g., as indicated at 804) at position $x_n$. For example, a contrast variation rate dy/dx is determined in accordance with equation (7) above. The device compares (944) the contrast variation rate determined at (942) with a threshold A (806).

As indicated at B, the device proceeds from operation 944 of FIG. 9B to decision diamond 946 of FIG. 9C.

The device determines (946) whether the contrast variation rate (e.g., 804) exceeds the threshold A 806 gradient value. In accordance with a determination that the contrast variation rate exceeds the threshold A gradient value, the device (948) will determine the next step size $s_n$ (e.g., at an next iteration of the operation 934) using increased next step size equation (6). In accordance with a determination that the contrast variation rate does not exceed the threshold A slope value, the device determines (950) whether the contrast variation rate (e.g., 804) exceeds the gradient of the threshold B 808. In accordance with a determination that contrast variation rate exceeds the threshold B gradient value, the device (952) will determine the next step size $s_n$ (e.g., at an next iteration of the operation 934) using decreased next step size equation (8).

As indicated at C, the device proceeds from operations 948 and/or 952 of FIG. 9C to the operation 954 of FIG. 9B. At the operation 954, the device generates a new curve using $(x_0, y_0)$, $(x_1, y_1)$, $(x_2, y_2)$, $(x_3, y_3)$ ... $(x_n, y_n)$. For example, a nonlinear least squares analysis is used to find a best fit curve to $(x_0, y_0)$, $(x_1, y_1)$, $(x_2, y_2)$, $(x_3, y_3)$ ... $(x_n, y_n)$. Operations 930, 932, 934, 936, 938, 940, 942, 944, 946, 948, 950, 952, and/or 954 repeat until the device determines that the contrast variation rate does not exceed the gradient of threshold B slope value.

In accordance with a determination that the contrast variation rate does not exceed the threshold B slope value, the device applies (956) a low pass filter to $(x_0, y_0)$, $(x_1, y_1)$, $(x_2, y_2)$, $(x_3, y_3)$ ... $(x_n, y_n)$ to obtain a filtered contrast distribution. The device determines (958) a gradient value dy/dx of the filtered contrast distribution, e.g., using equation (9) at the most recent position of the optical device 306 relative to the image sensor 304 (e.g., at $x_n$). The device compares (960) the determined gradient value dy/dx of the filtered contrast distribution at the position $x_n$ to threshold C (810). In some embodiments, in accordance with a determination that the determined gradient value dy/dx of the filtered contrast distribution exceeds the threshold C gradient value, the device proceeds to operation 902 of FIG. 9A, as indicated at D. In some embodiments, in accordance with a determination that the determined gradient value dy/dx of the filtered contrast distribution does not exceed the threshold C gradient value, the focus separation distance is determined to have been reached and the flow ends.

Figure 10A:
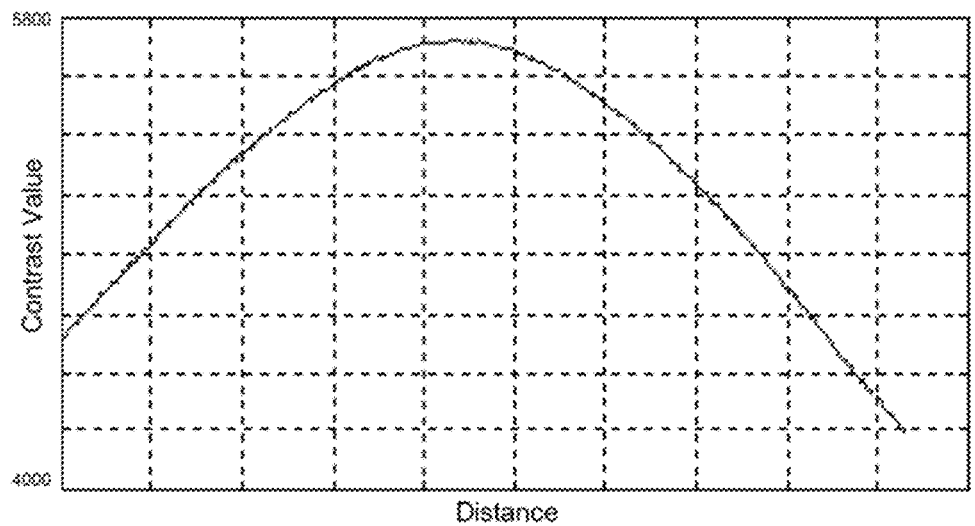
FIGS. 10A and 10B illustrate exemplary contrast distributions over a range from a minimum distance between an optical device and an image sensor to a maximum distance between the optical device and the image sensor.
Figure 10B:
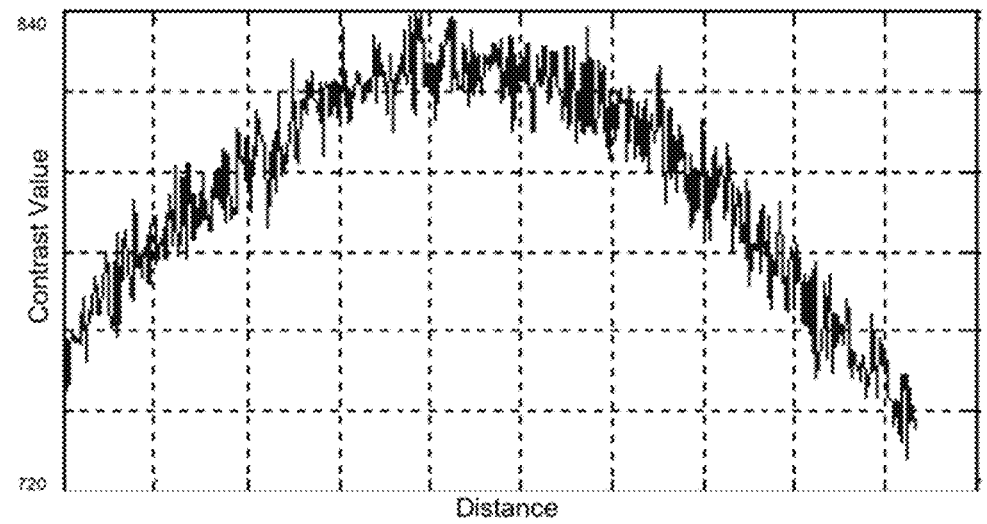
Figure 11A:
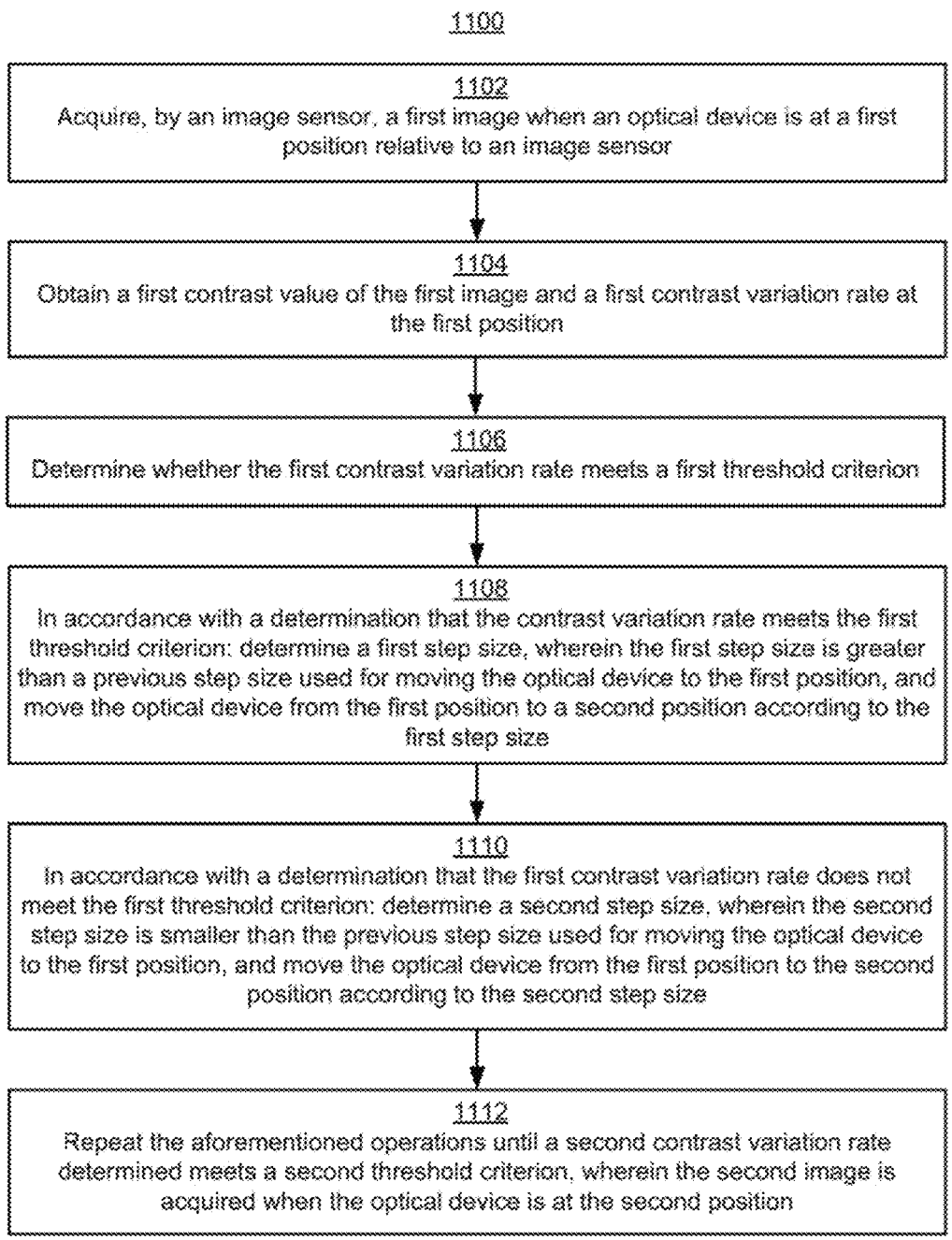

FIGS. 10A and 10B illustrate exemplary contrast distributions over a range from a minimum separation distance $x_{min}$ between the optical device 306 and the image sensor 304 to a maximum separation distance $x_{max}$ between the optical device 306 and the image sensor 304. FIG. 10A illustrates an example of a contrast distribution obtained in a high contrast setting and FIG. 10B illustrates an example of a contrast distribution obtained in a low contrast setting (e.g., a low light setting). The presence of noise in a contrast distribution (e.g., as demonstrated in FIG. 10B, particularly in comparison with FIG. 10A) due to, e.g., low light conditions, light flicker, and/or movement of the imaging device during the autofocus process, has the potential to reduce the accuracy with which a focus separation distance is determined. Applying a low pass filter to determined contrast values $(x_0, y_0)$, $(x_1, y_1)$, $(x_2, y_2)$, $(x_3, y_3)$ ... $(x_n, y_n)$ reduces the probability of inaccuracy in the determination of the focus separation distance due to noise.

FIGS. 11A-11D are a flow diagram illustrating a method 1100 for moving an optical device 306 relative to an image sensor 304 to focus an image 502, in accordance with some embodiments. The method 1100 is performed at a device, such as the movable object 102, the imaging device 302, the control unit 108 and/or the computing device 110. For example, instructions for performing the method 1100 are stored in the memory 204 and executed by the processor(s) 202.

The device acquires (1102), by the image sensor 304, a first image (current image) 502 when the optical device 306 is at a first position (current position) relative to the image sensor 304 (e.g., at a separation distance $x_n$ between the optical device 306 and the image sensor 304). The device obtains (1104) a first contrast value (current contrast value) $y_n$ of the first image 502 (e.g., a contrast value determined in accordance with equations (1) and/or (2)) and a first contrast variation rate (current contrast variation rate) dy/dx at the first position $x_n$ (e.g., a contrast variation rate determined in accordance with equation (7), such as the contrast variation rate illustrated at 804).

The device determines (1106) whether the first contrast variation rate dy/dx meets a first threshold criterion. For example, the device determines whether the first contrast variation rate dy/dx is greater than a first threshold gradient value (e.g., a threshold A gradient value as illustrated at 806 of FIG. 8D).

In accordance with a determination that the contrast variation rate meets the first threshold criterion, the device (1108): determines a first step size $s_n$, the first step size greater than a previous step size used for moving the optical device to the first position (e.g., equation (6) for determining an increased step size is used to determine the first step size $s_n$); and the device moves the optical device 306 from the first position to a second position according to the first step size $s_n$ (e.g., the optical device 306 is moved to a separation distance $x_n$ from the image sensor 304).

In accordance with a determination that the first contrast variation rate does not meet the first threshold criterion (e.g., the first contrast variation rate is less than (or equal to) the first threshold gradient value, such as a gradient value of threshold A as illustrated at 806 of FIG. 8D), the device (1110): determines a second step size $s_n$, the second step size smaller than the previous step size used for moving the optical device 306 to the first position (e.g., equation (8) for determining an decreased step size is used to determine the second step size $s_n$); and the device moves the optical device 306 from the first position to the second position according to the second step size $s_n$ (e.g., the optical device 306 is moved to a separation distance $x_n$ from the image sensor 304).

The device repeats (1112) the aforementioned operations (e.g., 1102, 1104, 1106, 1108, and/or 1110) until a second contrast variation rate (next contrast variation rate) dy/dx meets a second threshold criterion (e.g., the second contrast variation dy/dx is less than (or equal to) a second threshold gradient value such as threshold B (808)). The second image 502 is acquired when the optical device 306 is at the second position (separation distance) $x_{n+1}$.

In some embodiments, determining that the first contrast variation rate meets the first threshold criterion includes (1114) comparing the first contrast variation rate to a first threshold gradient value. For example, the first threshold gradient value is a gradient value indicating the slope of the line corresponding to threshold A, as shown at 806 of FIG. 8D.

In some embodiments, the first contrast variation rate meets the first threshold criterion when (1116) the first contrast variation rate exceeds a first threshold gradient value. For example, the first contrast variation rate meets the first threshold criterion when contrast variation rate dy/dx as determined in accordance with equation (7) exceeds a gradient value indicating the threshold A gradient value, as shown at 806 of FIG. 8D.

In some embodiments, determining that the second contrast variation rate meets the second threshold criterion includes (1118) comparing the second contrast variation rate to a second threshold gradient value, wherein the second threshold gradient value is less than (e.g., less steep than) the first threshold gradient value. For example, the second contrast variation rate meets the second threshold criterion when contrast variation rate dy/dx as determined in accordance with equation (7) exceeds a threshold B gradient value, as shown at 808 of FIG. 8D.

In some embodiments, determining at least one of the first step size and the second step size includes (1120): generating a curve based on a plurality of contrast values including the first contrast value (e.g., generating a curve based on $y_0$, $y_1$, $y_2$, $y_3$, $y_n$ as described with regard to 954 of FIG. 9B), determining a position (e.g., separation distance) of the optical device 306 relative to the image sensor 304 at which the curve has a peak value (e.g., determining a position $x_{peak}$ as described with regard to 932) and determining the first step size $s_n$ using the determined position (e.g., $x_{peak}$) of the optical device 306 relative to the image sensor 304 at which the curve has a peak value. For example, the determined $x_{peak}$ value is used to determine an increased step size $s_n$ as indicated in equation (6).

In some embodiments, in at least one iteration of the repeating operation, the curve is a Bezier curve (1122). For example, the Bezier curve is a quadradic or higher-order Bezier curve.

In some embodiments, the Bezier curve is a cubic Bézier curve (1124), e.g., the Bezier curve as defined at (3).

In some embodiments, in at least one iteration of the repeating operation, the curve is determined (1126) using a non-linear least squares analysis. For example, a non-linear least squares analysis is applied to find a best fit curve to ($x_0$, $y_0$), ($x_1$, $y_1$), ($x_2$, $y_2$), ($x_3$, $y_3$) ... ($x_n$, $y_n$).

In some embodiments, the device determines (1128) the first contrast value using at least one luminance gradient value from the first image 502, wherein a respective luminance gradient value is a luminance gradient across a portion (e.g., a 4 pixel×4 pixel array 512, or a 16 pixel×16 pixel array) of the first image 502. For example, a contrast value is determined in accordance with equations (1) and/or (2) above.

In some embodiments, the device determines (1130) the first contrast value using an average of a plurality of luminance gradient values from the first image 502 (e.g., four luminance gradient values corresponding to pixel arrays 504, 506, 508, 510 from quadrants 514, 516, 518, 520, respectively, of first image 502), as described with regard to equation (2).

In some embodiments, in response to determining that the second contrast variation rate meets a second threshold criterion (e.g., the second contrast variation rate is less than (or equal to) the slope of second threshold B gradient value, as indicated at 808), the device applies (1132) a filter to a plurality of obtained contrast values ($x_0$, $y_0$), ($x_1$, $y_1$), ($x_2$, $y_2$), ($x_3$, $y_3$) ... ($x_n$, $y_n$) to generate a filtered curve.

In some embodiments, the filter (1134) is a low pass filter.

In some embodiments, the low pass filter is (1136) a one-dimensional Gaussian filter.

In some embodiments, the device determines (1138) whether the filtered curve at the current position of the optical device 306 relative to the image sensor 304 satisfies an end criterion, and, in response to determining that the filtered curve does not satisfy the end criterion, the device initializes the optical device 306 at an initial position (e.g., $x_0$) relative to the image sensor 304 and repeats the aforementioned operations (e.g. repeats operations 1102-1112. In other words, the current autofocus attempt is aborted and the autofocus process is restarted from the initial position of the optical device 306 relative to the image sensor 304 (e.g., separation distance $x_0$). For example, in a target tracking or other video capture context, various aspects of the captured images, such as the composition and/or light level of captured images, may change rapidly over time, such that if a current autofocus attempt fails it is more efficient to restart the autofocus process by collecting new contrast values rather than continuing to try to achieve focus based on previously collected contrast values.

In some embodiments, determining whether the filtered curve at the current position of the optical device 306 relative to the image sensor 304 satisfies the end criterion includes (1140) determining whether a gradient of the filtered curve at the current position of the optical device (e.g., as determined using equation 9) relative to the image sensor meets a third threshold criterion. In some embodiments, the gradient of the filtered curve at the current position of the optical device meets a third threshold criterion when the gradient of the filtered curve at the current position of the optical device is less than (or equal to) a threshold C gradient value (e.g., as indicated at 810).

In some embodiments, the second contrast variation rate dy/dx is determined (1142) using a second contrast value $y_{n+1}$ obtained for a second image 502.

In some embodiments, the first contrast variation rate dy/dx is a gradient value indicating (1144) a rate of change of a contrast value from a previous image to a current image.

In some embodiments, a contrast variation rate difference is a difference (1146) between the first contrast value $y_n$ of the first image and a contrast value $y_{previous}$ of a previous image; a distance difference is a difference between a first distance (current distance) $x_n$ between the optical device and the image sensor at which the first image is captured and a second distance $x_{previous}$ between the optical device and the image sensor at which the second image is captured; and the rate of change of the contrast value is the contrast variation rate difference divided by the distance difference, e.g., as indicated in equation (7).

In some embodiments, initializing the optical device 306 at an initial position (e.g., $x_0$) relative to the image sensor 304 includes using data generated by a depth sensor of the movable object 102 to determine an initialization distance. For example, the initial position is determined based on output from a depth sensor (e.g., an image sensor, an audio sensor, and/or an infrared sensor) of the movable object sensing system 210.

Many features of the present disclosure can be performed in, using, or with the assistance of hardware, software, firmware, or combinations thereof. Consequently, features of the present disclosure may be implemented using a processing system. Exemplary processing systems (e.g., processor(s) 202) include, without limitation, one or more general purpose microprocessors (for example, single or multi-core processors), application-specific integrated circuits, application-specific instruction-set processors, field-programmable gate arrays, graphics processing units, physics processing units, digital signal processing units, coprocessors, network processing units, audio processing units, encryption processing units, and the like.

Features of the present disclosure can be implemented in, using, or with the assistance of a computer program product, such as a storage medium (media) or computer readable storage medium (media) having instructions stored thereon/in which can be used to program a processing system to perform any of the features presented herein. The storage medium (e.g., the memory 204) can include, but is not limited to, any type of disk including floppy disks, optical discs, DVD, CD-ROMs, microdrive, and magneto-optical disks, ROMs, RAMs, EPROMs, EEPROMs, DRAMs, VRAMs, DDR RAMs, flash memory devices, magnetic or optical cards, nanosystems (including molecular memory ICs), or any type of media or device suitable for storing instructions and/or data.

Stored on any one of the machine readable medium (media), features of the present disclosure can be incorporated in software and/or firmware for controlling the hardware of a processing system, and for enabling a processing system to interact with other mechanism utilizing the results of the present disclosure. Such software or firmware may include, but is not limited to, application code, device drivers, operating systems, and execution environments/containers.

Communication systems as referred to herein (e.g., the communication system 206) optionally communicate via wired and/or wireless communication connections. For example, communication systems optionally receive and send RF signals, also called electromagnetic signals. RF circuitry of the communication systems convert electrical signals to/from electromagnetic signals and communicate with communications networks and other communications devices via the electromagnetic signals. RF circuitry optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. Communication systems optionally communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. Wireless communication connections optionally use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 102.11a, IEEE 102.11ac, IEEE 102.11ax, IEEE 102.11b, IEEE 102.11g and/or IEEE 102.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

While various embodiments of the present disclosure have been described above, it should be understood that they have been presented by way of example, and not limitation. It will be apparent to persons skilled in the relevant art that various changes in form and detail can be made therein without departing from the spirit and scope of the disclosure.

The present disclosure has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the disclosure.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the invention be defined by the following claims and their equivalence.

What is claimed is:

1. A method for moving an optical device relative to an image sensor to focus an image, comprising:
   a. receiving a current image acquired by the image sensor when the optical device is at a current position relative to the image sensor;
   b. obtaining a current contrast value of the current image and a current contrast variation rate at the current position;
   c. determining whether the current contrast variation rate exceeds a first threshold gradient value;
   d. moving the optical device from the current position to a next position in accordance with the determination result; and
   repeating steps a to d until a next contrast variation rate for a next image exceeds a second threshold gradient value, the second threshold gradient value being less than the first threshold gradient value, the next image being acquired when the optical device is at the next position.

2. The method of claim 1, wherein moving the optical device from the current position to the next position in accordance with the determination result comprises:
   determining a step size, the step size being:
   greater than a previous step size used for moving the optical device to the current position in accordance with a determination that the current contrast variation rate exceeds the first threshold gradient value, or
   smaller than the previous step size in accordance with a determination that the current contrast variation rate does not exceed the first threshold gradient value; and
   moving the optical device from the current position to the next position according to the step size.

3. The method of claim 2, wherein determining the step size includes:
   generating a curve based on a plurality of contrast values including the current contrast value;
   determining a position of the optical device relative to the image sensor at which the curve has a peak value; and
   determining the step size using the position of the optical device relative to the image sensor at which the curve has a peak value.

4. The method of claim 3, wherein, in at least one iteration of the repeating steps, the curve is a Bézier curve.

5. The method of claim 4, wherein the Bezier curve is a cubic Bézier curve.

6. The method of claim 3, wherein, in at least one iteration of the repeating steps, the curve is determined using a non-linear least squares analysis.

7. The method of claim 1, wherein the current contrast value is determined using an average of at least one luminance gradient value from the current image, a respective luminance gradient value being a luminance gradient across a portion of the current image.

8. The method of claim 1, wherein:
   the current contrast variation rate is a gradient value indicating a rate of change of a contrast value from a previous image to the current image;
   a contrast value difference is a difference between the current contrast value and a contrast value of a previous image;
   a distance difference is a difference between a current distance between the optical device and the image sensor at which the current image is captured and a previous distance between the optical device and the image sensor at which the previous image was captured; and
   the rate of change of the contrast value is the contrast value difference divided by the distance difference.

9. The method of claim 1, further comprising:
   e. in response to determining that the next contrast variation rate exceeds the second threshold gradient value, applying a filter to a plurality of obtained contrast values to generate a filtered curve;
   f. determining whether the filtered curve at the current position of the optical device relative to the image sensor satisfies an end criterion; and
   g. in response to determining that the filtered curve does not satisfy the end criterion, initializing the optical device at an initial position relative to the image sensor; and
   repeating steps e to g.

10. The method of claim 9, wherein determining whether the filtered curve at the current position of the optical device relative to the image sensor satisfies the end criterion includes determining whether a gradient of the filtered curve at the current position of the optical device relative to the image sensor meets a third threshold criterion.

11. The method of claim 9, wherein the filter includes a low pass filter.

12. An unmanned aerial vehicle (UAV), comprising:
a propulsion system;
an imaging device comprising an image sensor and an optical device; and
one or more processors individually or collectively configured to:
  a. receive a current image acquired by the image sensor when the optical device is at a current position relative to the image sensor;
  b. obtain a current contrast value of the current image and a current contrast variation rate at the current position;
  c. determine whether the current contrast variation rate exceeds a first threshold gradient value;
  d. move the optical device from the current position to a next position in accordance with the determination result; and
  repeat steps a-d until a next contrast variation rate for a next image exceeds a second threshold gradient value, the second threshold gradient value being less than the first threshold gradient value, the next image being acquired when the optical device is at the next position.

13. The UAV of claim 12, wherein the one or more processors are further configured to, individually or collectively, moving the optical device from the current position to the next position by:
determining a step size, the step size being:
greater than a previous step size used for moving the optical device to the current position in accordance with a determination that the current contrast variation rate exceeds the first threshold gradient value, or
smaller than the previous step size in accordance with a determination that the current contrast variation rate does not exceed the first threshold gradient value; and
moving the optical device from the current position to the next position according to the step size.

14. The UAV of claim 13, wherein the one or more processors are further configured to, individually or collectively, determine the step size by:
generating a curve based on a plurality of contrast values including the current contrast value;
determining a position of the optical device relative to the image sensor at which the curve has a peak value; and
determining the step size using the position of the optical device relative to the image sensor at which the curve has a peak value.

15. The UAV of claim 12, further comprising:
a depth sensor, data generated by the depth sensor being used for determining an initialization distance between the optical device and the image sensor.

16. The UAV of claim 12, wherein the current contrast value is determined using at least one luminance gradient value from the current image, a respective luminance gradient value being a luminance gradient across a portion of the current image.

17. The UAV of claim 12, wherein the current contrast variation rate is a gradient value indicating a rate of change of a contrast value from a previous image to the current image.

18. The UAV of claim 17, wherein:
a contrast value difference is a difference between the current contrast value and a contrast value of a previous image;
a distance difference is a difference between a current distance between the optical device and the image sensor at which the current image is captured and a previous distance between the optical device and the image sensor at which the previous image was captured; and
the rate of change of the contrast value is the contrast value difference divided by the distance difference.

19. A system for focusing an image, comprising:
one or more processors; and
an optical device and an image sensor;
the one or more processors configured for:
  a. receiving a current image acquired by the image sensor when the optical device is at a current position relative to the image sensor;
  b. obtaining a current contrast value of the current image and a current contrast variation rate at the current position;
  c. determining whether the current contrast variation rate exceeds a first threshold gradient value;
  d. moving the optical device from the current position to a next position in accordance with the determination result; and
  repeating steps a to d until a next contrast variation rate for a next image exceeds a second threshold gradient value, the second threshold gradient value being less than the first threshold gradient value, the next image being acquired when the optical device is at the next position.

20. The system of claim 19, wherein moving the optical device from the current position to the next position in accordance with the determination result comprises:
determining a step size, the step size being:
greater than a previous step size used for moving the optical device to the current position in accordance with a determination that the current contrast variation rate exceeds the first threshold gradient value, or
smaller than the previous step size in accordance with a determination that the current contrast variation rate does not exceed the first threshold gradient value; and
moving the optical device from the current position to the next position according to the step size.

* * * * *